United States Patent
Lee et al.

(10) Patent No.: US 10,966,009 B2
(45) Date of Patent: Mar. 30, 2021

(54) DISPLAY APPARATUS

(71) Applicant: LG Display Co., Ltd., Seoul (KR)

(72) Inventors: Sungtae Lee, Bucheon-si (KR); KwanHo Park, Bucheon-si (KR); YeongRak Choi, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/810,449

(22) Filed: Mar. 5, 2020

(65) Prior Publication Data

US 2020/0204893 A1   Jun. 25, 2020

Related U.S. Application Data

(63) Continuation of application No. 16/047,607, filed on Jul. 27, 2018, now Pat. No. 10,681,441.

(30) Foreign Application Priority Data

Aug. 3, 2017   (KR) .......................... 10-2017-0098710

(51) Int. Cl.
*H04R 1/02* (2006.01)
*H04R 11/02* (2006.01)
(Continued)

(52) U.S. Cl.
CPC ........... *H04R 1/028* (2013.01); *G06F 1/1605* (2013.01); *H04R 1/025* (2013.01); *H04R 1/26* (2013.01);
(Continued)

(58) Field of Classification Search
CPC .......... H04R 1/028; H04R 9/06; H04R 1/025; H04R 2499/11; H04R 7/045; H04R 1/323;
(Continued)

(56) References Cited

U.S. PATENT DOCUMENTS 5,025,474 A * 6/1991 Tanaka ................. G03B 21/565
181/148
2003/0128503 A1 7/2003 Takahashi
(Continued)

FOREIGN PATENT DOCUMENTS

CN   204377096 U   6/2015
CN   204425649 U   6/2015
(Continued)

OTHER PUBLICATIONS

First Notification of Office Action dated Mar. 18, 2020, issued in corresponding Chinese Patent Application No. 201810865831.3.
(Continued)

*Primary Examiner* — Yogeshkumar Patel
(74) *Attorney, Agent, or Firm* — Morgan, Lewis & Bockius LLP

(57) ABSTRACT

A display apparatus includes: a display panel configured to display an image, a supporting member on a rear surface of the display panel, at least one sound generation device adjacent to the display panel, a wiring configured to transfer a signal to the at least one sound generation device, and a supporting plate on the rear surface of the display panel, the supporting plate being under the at least one sound generation device and the wiring.

26 Claims, 28 Drawing Sheets

(51) Int. Cl.
  *H04R 9/02*   (2006.01)
  *H04R 7/04*   (2006.01)
  *G06F 1/16*   (2006.01)
  *H04R 1/26*   (2006.01)
  *H04R 9/04*   (2006.01)

(52) U.S. Cl.
  CPC ............ *H04R 7/045* (2013.01); *H04R 9/025* (2013.01); *H04R 9/04* (2013.01); *H04R 11/02* (2013.01); *H04R 2400/03* (2013.01); *H04R 2440/05* (2013.01); *H04R 2440/07* (2013.01); *H04R 2499/11* (2013.01); *H04R 2499/15* (2013.01)

(58) Field of Classification Search
  CPC .. H04R 2400/03; H04R 2440/05; H04R 5/02; H04R 9/02; H04R 9/025; H04R 9/04; H04R 9/045; H04R 9/063; H04R 11/02; H04R 1/26; H04R 2440/07; H04R 2499/15; G06F 1/1605; G06F 1/1637; G06F 1/1683
  See application file for complete search history.

(56) References Cited

U.S. PATENT DOCUMENTS

| | | |
|---|---|---|
| 2005/0111678 A1 | 5/2005 | Wada et al. |
| 2006/0006296 A1 | 1/2006 | Morita |
| 2006/0140438 A1 | 6/2006 | Kimura et al. |
| 2006/0227258 A1* | 10/2006 | Lee .................... G02F 1/133308 349/58 |
| 2007/0071259 A1* | 3/2007 | Tojo ........................ H04R 1/323 381/152 |
| 2009/0034758 A1 | 2/2009 | Ko et al. |
| 2011/0211725 A1 | 9/2011 | Takwea et al. |
| 2015/0341714 A1 | 11/2015 | Ahn et al. |
| 2016/0150318 A1 | 5/2016 | Donarski et al. |
| 2016/0219372 A1* | 7/2016 | Wang ................... H04R 17/005 |
| 2017/0280234 A1 | 9/2017 | Choi et al. |
| 2017/0280246 A1 | 9/2017 | Choi et al. |

FOREIGN PATENT DOCUMENTS

| | | | |
|---|---|---|---|
| CN | 106101948 A | 11/2016 | |
| EP | 2693263 A1 * | 2/2014 | ............... H04N 5/64 |
| KR | 10-1704517 B1 | 2/2017 | |
| KR | 20170114471 A * | 10/2017 | ........... H01L 27/322 |

OTHER PUBLICATIONS

《东莞科技馆之旅》,秦国任, page 165, 广东人民出版社 ("Dongguan Science and Technology Museum Tour", Li Guoren, p. 165, Guangdong People's Publishing House.) Apr. 30, 2009.

* cited by examiner

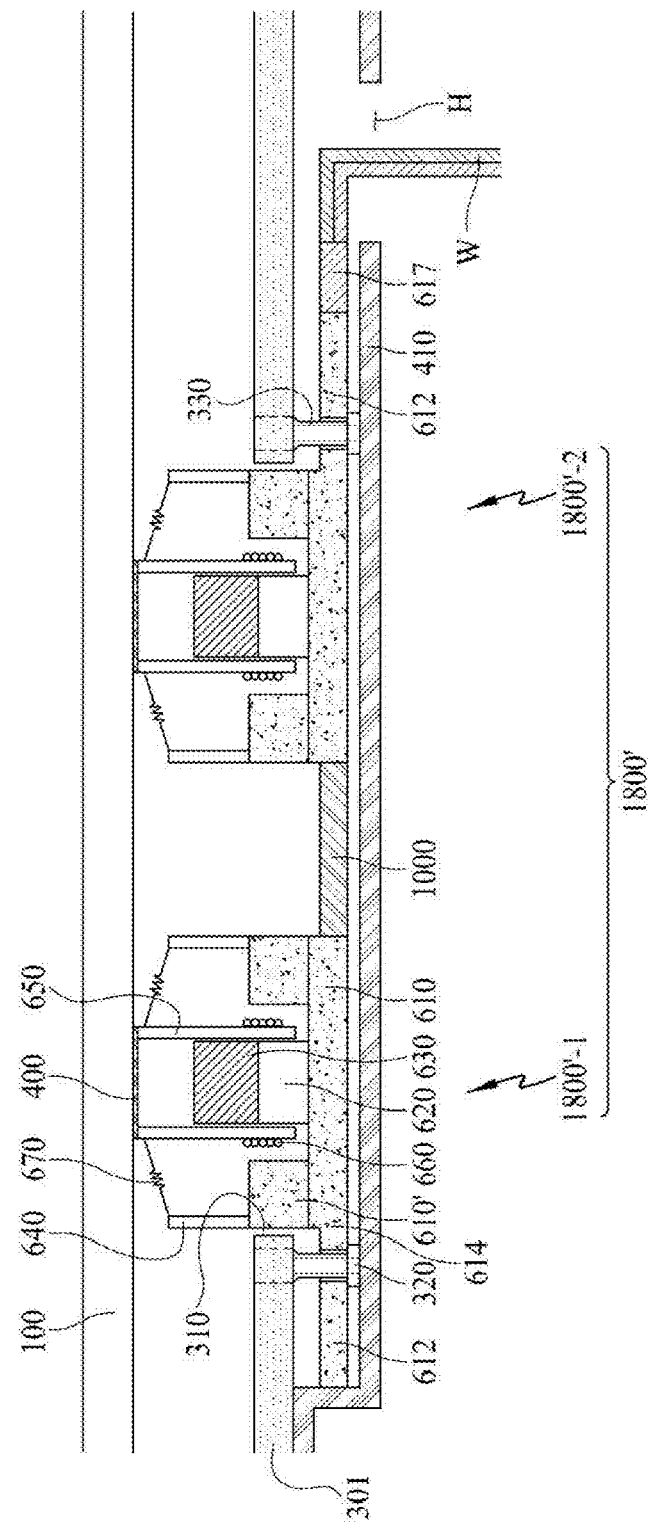

DISPLAY APPARATUS

CROSS-REFERENCE TO RELATED APPLICATION(S)

This application is a continuation of U.S. patent application Ser. No. 16/047,607, filed on Jul. 27, 2018, which claims the benefit of and priority to Korean Patent Application No. 10-2017-0098710, filed on Aug. 3, 2017, the entirety of each of which is hereby incorporated by reference.

BACKGROUND

1. Technical Field

The present disclosure relates to a display apparatus, and more particularly, to a display apparatus that vibrates a display panel to generate sound.

2. Discussion of the Related Art

With the advancement of an information-oriented society, various requirements for the display field of expressing information in accordance with an electrical information signal are increasing. Thus, research is being conducted on various display apparatuses that are thin, light, and have low power consumption. For example, display apparatuses include a liquid crystal display (LCD) apparatus, a field emission display (FED) apparatus, an organic light-emitting display apparatus, a light-emitting diode display apparatus, a quantum dot light-emitting display apparatus, etc.

Among the above display apparatus, the LCD apparatus may include an array substrate including a thin film transistor (TFT), an upper substrate including a color filter and/or a black matrix, and a liquid crystal layer between the array substrate and the upper substrate. An alignment state of the liquid crystal layer is controlled based on an electric field applied to two electrodes in a pixel region, whereby light transmittance is adjusted based on the alignment state of the liquid crystal layer, thereby displaying an image.

The light-emitting diode display apparatus, the quantum dot light-emitting display apparatus, and the organic light-emitting display apparatus, which are self-light emitting display apparatuses, have advantages in fast response time, high emission efficiency, high luminance, and a wide viewing angle in comparison with other display apparatuses. Thus, these apparatuses are attracting much attention.

A display apparatus may display an image, and an additional speaker for supplying sound generally has to be provided. If the speaker is provided in the display apparatus, the sound generated in the speaker advances toward a lower or rear portion of the display panel, instead of toward a front portion of the display panel. Thus, the sound does not advance toward the front portion of the display panel, i.e., toward a user who watches the image displayed on the display panel, which may be disruptive to a user's immersion experience.

In addition, when the sound generated in the speaker advances toward the lower or rear portion of the display panel, sound quality is deteriorated due to interference with sound reflected on the wall or floor. Furthermore, when the speaker is included in a set apparatus, such as a television (TV), the speaker occupies a space, which may impose a restriction on design and a spatial disposition of the set apparatus is limited.

SUMMARY

Accordingly, the present disclosure is directed to a display apparatus that substantially obviates one or more of the issues due to limitations and disadvantages of the related art.

An aspect of the present disclosure is to provide a display apparatus including a sound generation device capable of outputting sound to a front direction of a display panel.

Another aspect of the present disclosure is to provide a display apparatus having an enhanced aesthetic because a sound generation device and a wiring for supplying a signal to the sound generation device are disposed to not be visible at a supporting member.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display panel configured to display an image, a supporting member on a rear surface of the display panel, at least one sound generation device adjacent to the display panel, a wiring configured to transfer a signal to the at least one sound generation device, and a supporting plate on the rear surface of the display panel, the supporting plate being under the at least one sound generation device and the wiring.

In another aspect, there is provided a display apparatus, including: display apparatus, comprising: a display panel configured to display an image; at least one supporting member on a rear surface of the display panel; at least one sound generation device adjacent to the display panel; a wiring configured to transfer a signal to the at least one sound generation device; and a supporting plate on a rear surface of the at least one supporting member, the supporting plate comprising at least one hole through which the wiring extends to the rear surface of the at least one supporting member.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

FIG. 9 illustrates a display apparatus according to an example embodiment of the present disclosure.

Figure 1A:
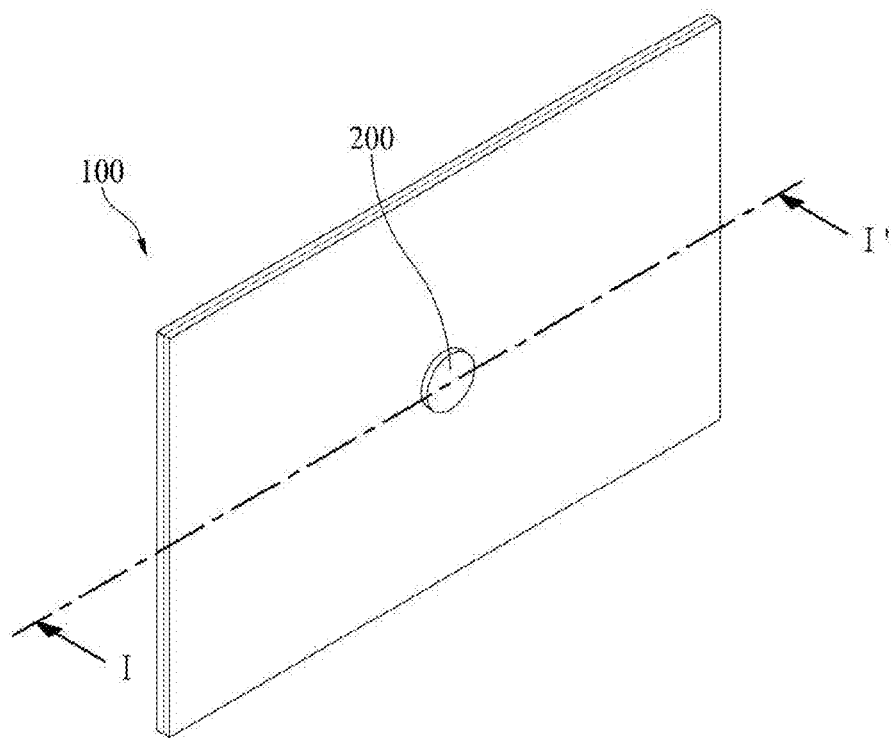
FIG. 1A illustrates a display apparatus including a sound generation device according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

In the present disclosure, examples of a display apparatus is used to encompass a display apparatus such as an organic light emitting display module (OLED module) or a liquid crystal module (LCM), that includes a display panel and a driving unit for driving the display panel. The display apparatus is used to further encompass a set device (or a set apparatus) or a set electronic apparatus, as a finished product, such as a notebook computer or a laptop computer, a television set, a computer monitor, an equipment apparatus (e.g., display equipment in an automotive apparatus or another type of vehicle apparatus) or a mobile electronic apparatus that is a complete product or a final product (for example, a smartphone or an electronic pad, etc.) that includes the LCM or the OLED module. Therefore, in the present disclosure, the display apparatus is used display apparatus itself, such as the LCM or the OLED module, and also a set apparatus which is a final consumer apparatus or an application product including the LCM or the OLED module.

In some example embodiments, the LCM or the OLED module including a display panel and a driving unit thereof may be referred to as a display apparatus, and the electronic apparatus as a final product including the LCM or the OLED module may be referred to as a set apparatus. For example, the display apparatus may include a display panel, such as an LCD or an OLED, and a source printed circuit board (PCB) as a controller for driving the same, the set apparatus may further include a set PCB that is a set controller set to be electrically connected to the source PCB and to control the overall operations of the set apparatus.

A display panel applied to an embodiment may use all types of display panels, such as a liquid crystal display panel, an organic light emitting diode (OLED) display panel, and an electroluminescent display panel, but is not limited to these specific types. For example, the display panel of the present disclosure may be any panel capable of being vibrated by a sound generation device according to embodiments of the present disclosure to output a sound. A shape or a size of a display panel applied to a display apparatus according to embodiments of the present disclosure is not limited.

For example, if a display panel is a liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT), which is a switching element for adjusting a light transmittance of each of the plurality of pixels, an upper substrate including a color filter and/or a black matrix, and a liquid crystal layer between the array substrate and the upper substrate.

In addition, if a display panel is an organic light-emitting display panel, the display panel may include a plurality of gate lines, a plurality of data lines, and a plurality of pixels respectively provided in a plurality of pixel areas defined by intersections of the gate lines and the data lines. The display panel may include an array substrate including a TFT, which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact, and may prevent moisture or oxygen from penetrating into the organic light emitting device layer. A layer provided on the array substrate may include an inorganic light-emitting layer (for example, a nano-sized material layer, a quantum dot, or the like). The display panel may further include a backing such as a metal plate attached to the rear surface of the display panel, but the backing is not limited to the metal plate, and another structure may be included.

In the present disclosure, the display panel including a sound generation device may be implemented at a user interface module in a vehicle, such as the central control panel area in an automobile. For example, such a display panel may be configured between two front seat occupants, such that sounds due to a vibration of the display panel propagate towards the interior of the vehicle. As such, the audio experience within a vehicle can be improved as compared to having speakers at the interior sides or edges of the vehicle.

The inventors have recognized the above-described problems and have conducted various experiments so that, when watching an image in front of a display panel, a traveling direction of sound becomes a direction toward a front portion of the display panel. Thus, sound quality is enhanced. Through the various experiments, the inventors have invented a display apparatus having a new structure, which facilitates output of sound so that a traveling direction of sound becomes a direction toward a front portion of a display panel, thereby enhancing sound quality.

Hereinafter, a display apparatus according to an embodiment of the present disclosure will be described in detail with reference to the accompanying drawings.

FIG. 1A illustrates a display apparatus including a sound generation device according to an example embodiment of the present disclosure.

With reference to FIG. 1A, a display apparatus 10 may include a display panel 100, which displays an image, and a sound generation device 200 that may vibrate the display panel 100 to generate sound. The sound generation device 200 may be referred to, for example, as an actuator, an exciter, or a transducer.

Figure 1B:
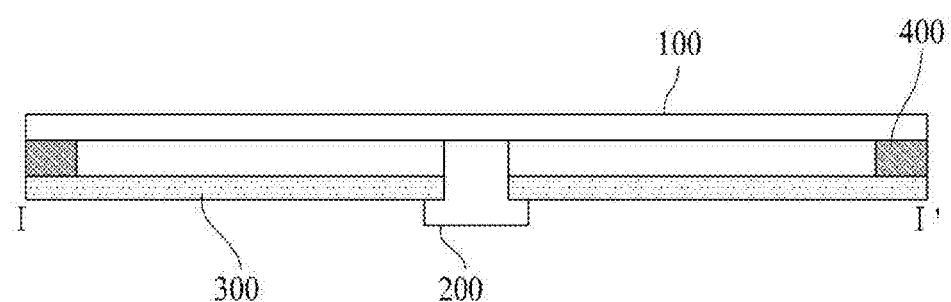
FIG. 1B is a cross-sectional view taken along line I-I' of FIG. 1A.

FIG. 1B is a cross-sectional view taken along line I-I' of FIG. 1A.

With reference to FIG. 1B, the display apparatus may include the sound generation device 200 and a supporting member 300. The supporting member 300 may support one or more of a rear surface and a side surface of the display panel 100. Also, the sound generation device 200 may be fixed to the supporting member 300.

The supporting member 300 may be, for example, a cover bottom. Alternatively, the supporting member 300 may further include a middle cabinet, which may be connected to a cover bottom, may surround the side surface of the display panel 100, may accommodate one periphery of the display panel 100, and may support the display panel 100. For example, the middle cabinet may include a "┤"-shaped (or T-shape at a 90-degree angle) cross-sectional surface. The supporting member 300 may include the cover bottom, or may include the cover bottom and the middle cabinet, but embodiments are not limited thereto. For example, the supporting member 300 may include a structure that may cover the rear surface or the side surface of the display panel 100. Moreover, the supporting member 300 may be a plate on the rear surface of the display panel 100, or all over the display panel 100.

The supporting member 300 may be referred to as a cover bottom, a plate bottom, a back cover, a base frame, a metal frame, a metal chassis, a chassis base, or an m-chassis. Therefore, the supporting member 300 may be a supporter for supporting the display panel 100, and may be implemented as all types of frames or plate structure on the rear surface of the display device.

An adhesive member 400 may be in a periphery of each of the display panel 100 and the supporting member 300, and may attach the display panel 100 to the supporting member 300. The adhesive member 400 may include a double-sided tape, a single-sided tape, an adhesive, a bond, and/or the like, but embodiments are not limited thereto.

Figure 2A:
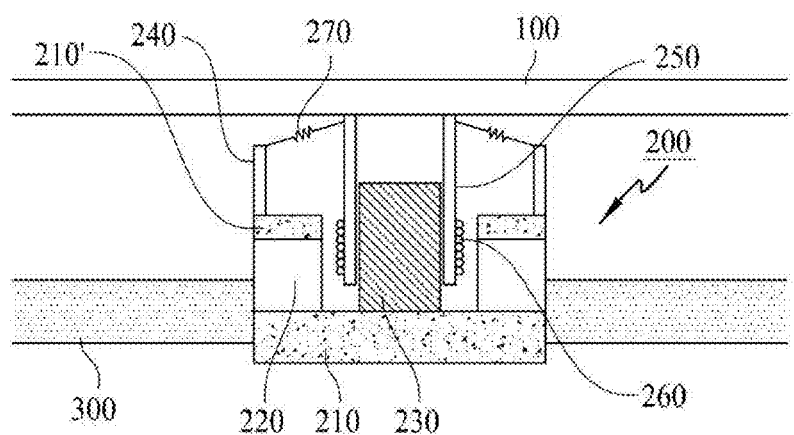
FIGS. 2A and 2B are cross-sectional views illustrating a sound generation device according to an example embodiment of the present disclosure.
Figure 2B:
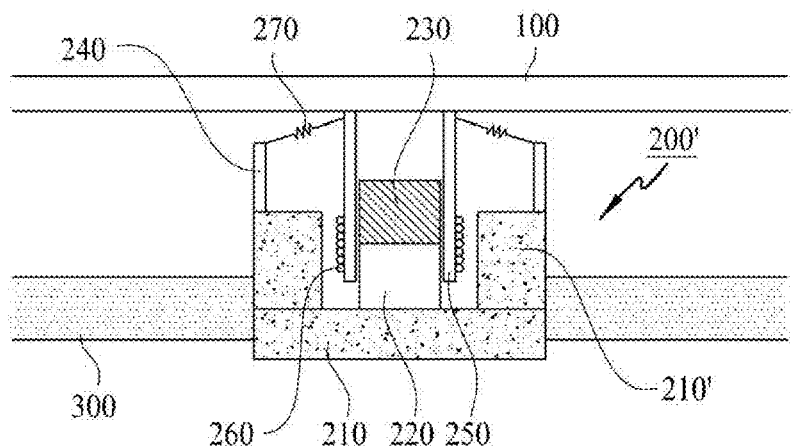

FIGS. 2A and 2B are cross-sectional views illustrating a sound generation device according to an example embodiment of the present disclosure.

The sound generation device may be classified into a first structure in which a magnet is disposed outside a coil, and a second structure in which a magnet is disposed inside a coil. The first structure may be referred to as a "dynamic" type or an "external magnetic" type. The second structure may be referred to as a "micro" type or an "internal magnetic" type. FIG. 2A illustrates the first structure, and FIG. 2B illustrates the second structure.

With reference to FIG. 2A, a sound generation device 200 may include a plurality of plates 210 and 210', a magnet 220 on a corresponding plate, a center pole 230 on a corresponding plate, a bobbin 250 near the center pole 230, and a coil 260 wound around the bobbin 250. For example, the magnet 220 may be on a first plate 210, and a second plate 210' may be on the magnet 220. The first plate 210 and the second plate 210' may support the magnet 220, and may fix the sound generation device 200 to a supporting member 300. Therefore, the first plate 210 may be fixed to a supporting hole provided in the supporting member 300, and the magnet 220 (between the first plate 210 and the second plate 210') may be fixed and supported.

At least one of the first plate 210 and the second plate 210' may be formed of a material having magnetism, such as iron (Fe), although embodiments are not limited thereto. A "plate" is not limited to the term, and may be expressed by using another term, such as a yoke.

The magnet 220 may be implemented, e.g., with a sintered magnet with a material, such as barium ferrite. A material of the magnet 220 may include one or more of: ferric oxide ($Fe_2O_3$), barium carbonate (or witherite) ($BaCO_3$), a neodymium (Nd) magnet, strontium ferrite ($Fe_{12}O_{19}Sr$), e.g., with an improved magnet component, an alloy cast magnet including aluminum (Al), nickel (Ni), and cobalt (Co), and the like. As another example, the neodymium magnet may be neodymium-iron-boron (Nd—Fe—B). However, embodiments are not limited these examples.

A frame 240 may be disposed outside the first plate 210 and on the second plate 210'. A center pole 230 may be disposed in a center region of the first plate 210. The center pole 230 and the first plate 210 may be provided as one body. The center pole 230 may be referred to as "pole pieces." Alternatively, pole pieces may be further disposed on the center pole 230.

Moreover, the bobbin 250 may surround the center pole 230. The coil 260 may be wound around a lower portion of the bobbin 250, and a current for generating sound may be applied to the coil 260.

The bobbin 250 may be a ring-shaped structure that may be formed of paper, an aluminum (Al) sheet, and/or the like. The coil 260 may be wound around a particular lower region of the bobbin 250. The generic term for the bobbin 250 and the coil 260 may be a voice coil.

Moreover, a damper 270 may be between the frame 240 and a portion of an upper side of the bobbin 250. The damper may be expressed using another term, such as an edge.

FIG. 2B illustrates the second structure where a magnet is disposed inside a coil. With reference to FIG. 2B, a sound generation device 200' having the second structure may include a magnet 220 on a first plate 210, a center pole 230 on the magnet 220, a bobbin 250 near the magnet 220 and the center pole 230, and a coil 260 wound around the bobbin 250.

The first plate 210 may be fixed to a supporting hole provided in a supporting member 300. The magnet 220 may be disposed on the first plate 210, and the center pole 230 may be disposed on the magnet 220. The center pole 230 may be referred to as "pole pieces." Alternatively, pole pieces may be further disposed on the center pole 230.

Moreover, the bobbin 250 may surround the magnet 220 and the center pole 230. The coil 260 may be wound around the bobbin 250. A second plate 210' may be near the first plate 210, and a frame 240 may be outside the second plate 210'. Also, a damper 270 may be between the frame 240 and the bobbin 250. In the sound generation device having the second structure, leakage magnetic flux is relatively small, and a total size may be relatively small, in comparison with the first structure where a magnet may be relatively outside a coil.

The bobbin or the voice coil of the sound generation device according to an embodiment of the present disclosure may be configured in a circular shape, an elliptical shape, or an oval shape. An oval shape may include an elliptical shape, an egg-shape, a rectangular shape with rounded corners, or other non-circular curved shape having a width different from its height, although embodiments are not limited to these examples. If the bobbin or the voice coil is configured in an elliptical shape or an oval shape, a sound having a high-pitched sound band may be improved in comparison with sound generated using a bobbin of a circular shape, and the occurrence of heat caused by a vibration of the bobbin or the voice coil may be reduced, thereby enhancing a heat dissipation characteristic.

The sound generation device applied to the display apparatus according to an embodiment of the present disclosure is not limited to the first structure illustrated in FIG. 2A and the second structure illustrated in FIG. 2B. For example, the display apparatus according to an embodiment of the present disclosure may include another kind of sound generation device that may vibrate a display panel to generate sound.

Figure 3A:
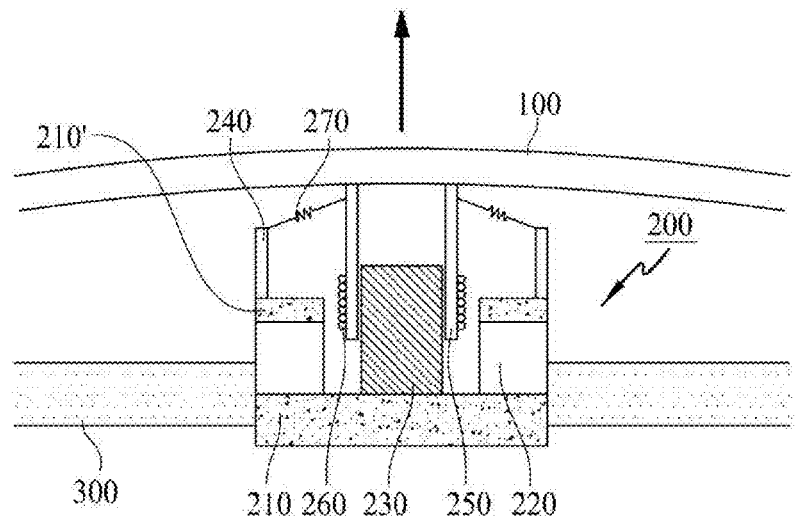
FIGS. 3A and 3B illustrate a sound generating operation method of a sound generation device with a first structure according to an example embodiment of the present disclosure.
Figure 3B:
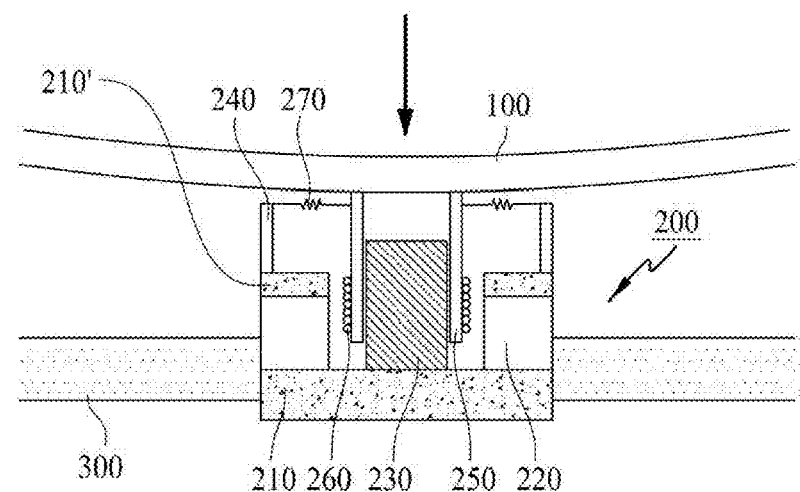

FIGS. 3A and 3B illustrate a sound generating operation method of a sound generation device with a first structure according to an example embodiment of the present disclosure.

FIG. 3A illustrates a state in which a current is applied. The center pole 230 connected to a bottom of the magnet 220 may become a north (N) pole, and the second plate 210' connected to an upper portion of the magnet 220 may become a south (S) pole. Thus, an external magnetic field may be generated around the coil 260.

In this state, if the current for generating a sound is applied to the coil 260, an applied magnetic field is formed around the coil 260, whereby a force for upwardly moving the bobbin 250 may be generated by the applied magnetic field and the external magnetic field. For example, when the current is applied to the coil 260, the magnetic field may be generated around the coil 260, and the external magnetic field may be generated by the magnet 220, whereby the entire bobbin 250 may be guided and may move upward by the center pole 230 according to Fleming's Left-Hand Rule for Motors based on the generated magnetic field and the external magnetic field generated by the magnet 220.

Accordingly, as one surface of the bobbin 250 may contact a rear surface of the display panel 100, the bobbin 250 may vibrate the display panel 100 in an upward direction (illustrated as an arrow) according to whether or not the current is applied to the coil 260, and a sound wave (or sound) is generated by the vibration of the display panel 100. In this state, when the current stops or a reverse current is applied, as shown in FIG. 3B, a force for downwardly moving the bobbin 250 may be generated, similar to the principle described with reference to FIG. 3A, and the display panel 100 may vibrate in a downward direction (illustrated as an arrow).

The damper 270 may be between the frame 240 and some portion of an upper side of the bobbin 250. The damper 270 may have a wrinkled structure, e.g., having elasticity, and the damper 270 may control (or dampen) the up-and-down vibration of the bobbin 250 by contraction and relaxation movements in accordance with the up-and-down movement of the bobbin 250. That is, the damper 270 may be connected to the bobbin 250 and the frame 240, and the up-and-down vibration of the bobbin 250 may be controlled by a restoring force of the damper 270. For example, when the bobbin 250 vibrates by a certain height or more or vibrates by a certain height or less, the bobbin 250 may be restored to its original position by the restoring force of the damper 270.

Therefore, the display panel 100 may vertically vibrate based on an application direction and level of a current applied to the coil 260. A sound wave may be generated by the vibration.

Figure 4A:
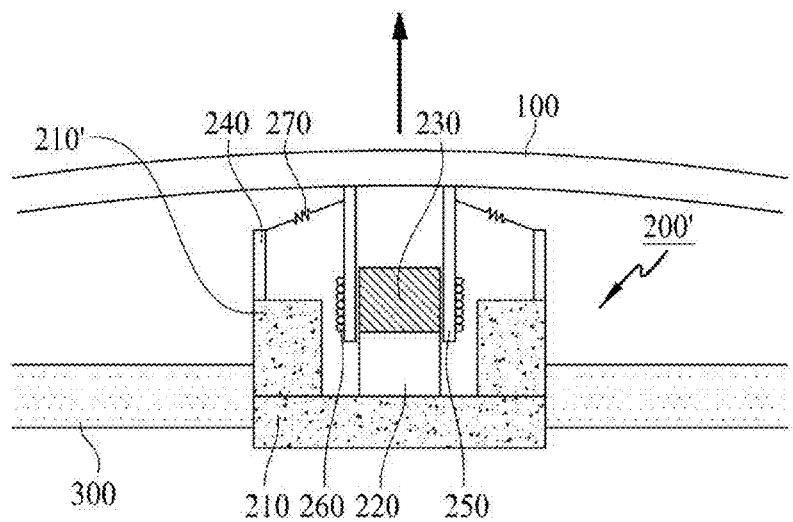
FIGS. 4A and 4B illustrate a sound generating operation method of a sound generation device with a second structure according to an example embodiment of the present disclosure.
Figure 4B:
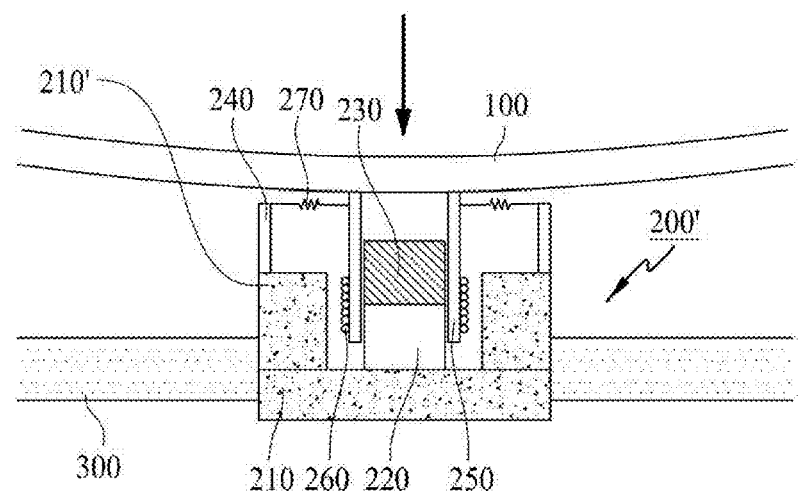

FIGS. 4A and 4B illustrate a sound generating operation method of a sound generation device with a second structure according to an example embodiment of the present disclosure.

FIG. 4A illustrates a state in which a current is applied. The second plate 210' becomes an S-pole, and the center pole 230 connected to an upper surface of the magnet 220 becomes an N-pole, whereby an external magnetic field may be generated between coils 260. The S-pole and the N-pole may be interchanged. If so, the sound generation device may similarly operate by changing a winding direction of the coil 260. In this state, when a current for generating a sound is applied to the coil 260, an applied magnetic field may be generated around the coil 260, whereby a force for upwardly moving the bobbin 250 to an upper side may be generated by the applied magnetic field and the external magnetic field. For example, when the current is applied to the coil 260, the magnetic field may be generated around the coil 260. Thus, the bobbin 250 may be guided by the center pole 230 according to Fleming's Left-Hand Rule for Motors based on the generated magnetic field and the external magnetic field generated by the magnet 220.

Accordingly, as one surface of the bobbin 250 may contact a rear surface of the display panel 100, the bobbin 250 may vibrate the display panel 100 in an upward direction (illustrated as an arrow) according to whether or not the current is applied to the coil 260, and a sound wave (or sound) may be generated by the vibration of the display panel 100. In this state, when the application of the current stops or a reverse current is applied, as shown in FIG. 4B, a force for moving the bobbin 250 to a lower side may be generated according to principles similar to the above description with reference to FIG. 4A, and the display panel 100 may be vibrated in a downward direction (illustrated as an arrow).

The damper 270 may be between the frame 240 and some portion of an upper side of the bobbin 250. The damper 270 may have a wrinkled structure, having elasticity, whereby the damper 270 may control the up-and-down vibration of the bobbin 250 by contraction and relaxation movements in accordance with the up-and-down movement of the bobbin 250. That is, the damper 270 may be connected to the bobbin 250 and the frame 240, and the up-and-down vibration of the bobbin 250 may be controlled (or dampened) by a restoring force of the damper 270. For example, when the bobbin 250 vibrates by a particular height or more, or vibrates by a particular height or less, the bobbin 250 may be restored to an original position by the restoring force of the damper 270. Accordingly, the display panel 100 may be vibrated in the up-and-down direction in accordance with the direction and level of the current applied to the coil 260, to thereby generate a sound wave by the vibration.

Figure 5A:
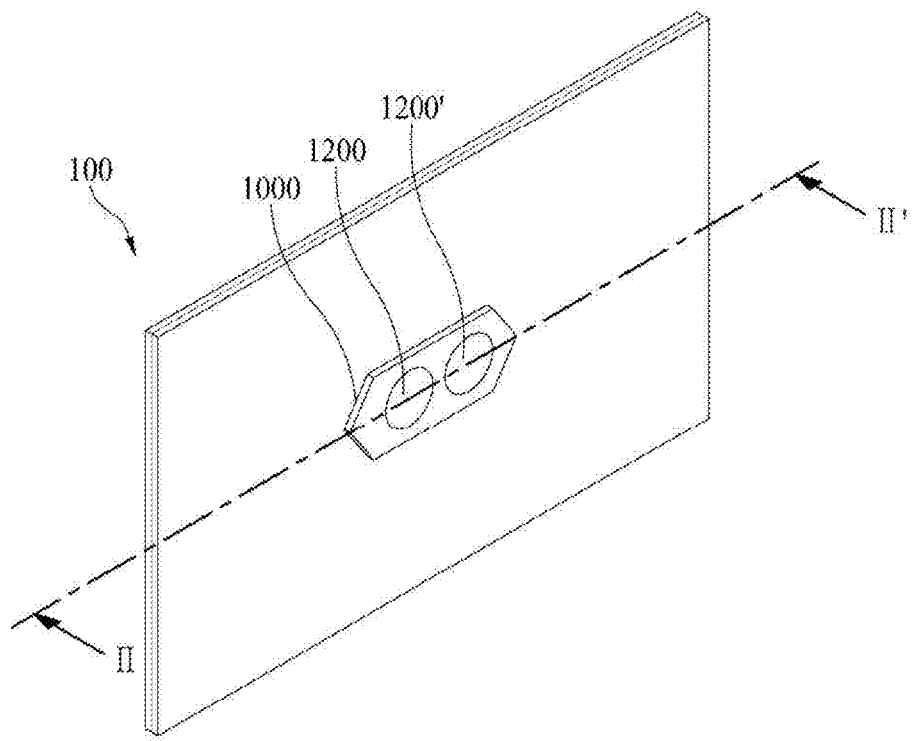
FIG. 5A illustrates a display apparatus including a sound generation device according to another example embodiment of the present disclosure.
Figure 5B:
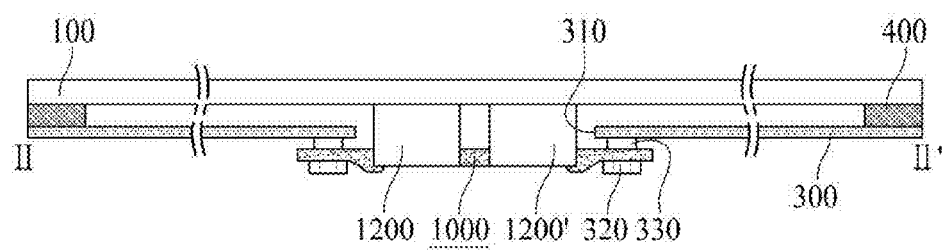
FIG. 5B is a cross-sectional view taken along line II-II' of FIG. 5A.

FIG. 5A illustrates a display apparatus including a sound generation device according to another example embodiment of the present disclosure. FIG. 5B is a cross-sectional view taken along line II-II' of FIG. 5A.

With reference to FIG. 5A, a display apparatus may include a display panel 100 that may display an image, and first and second sound generation devices 1200 and 1200' that may vibrate the display panel 100 to generate sound. The first sound generation device 1200 and the second sound generation device 1200' may be adjacent to each other. If the plurality of sound generation devices are provided and spaced apart from one another, it may be difficult to maintain a contact characteristic between the sound generation devices and the display panel, which may cause deterioration of sound quality by interference and delay phenomenon of the sound wave generated in the plurality of sound generation devices. Thus, in comparison to a structure in which the plurality of sound generation devices are spaced apart from each other, a structure according to an embodiment of the present disclosure in which sound generation devices are adjacent to each other may reduce interference or delay phenomenon of the sound wave generated in the sound generation devices, to thereby improve the sound output characteristic. This will be described below with reference to FIG. 7.

The first structure or the second structure described above with reference to FIGS. 2A and 2B may be applied to a structure of each of the first sound generation device 1200 and the second sound generation device 1200'. The bobbin or the voice coil of the sound generation device according to an embodiment of the present disclosure may be configured in a circular shape or an oval shape. If the bobbin or the voice coil is configured in an oval shape, a sound having a high-pitched sound band may be improved in comparison with a circular shape, and the occurrence of heat caused by a vibration of the bobbin or the voice coil may be reduced, thereby enhancing a heat dissipation characteristic.

For example, the display apparatus may include a fixing device 1000 for fixing the first sound generation device 1200 and the second sound generation device 1200'. The fixing device 1000 may include a mold structure manufactured by a molding process, e.g., using a plastic material, but embodiments are not limited thereto. The fixing device 1000 will be described in detail below with reference to FIG. 6.

With reference to FIG. 5B, a display apparatus may include a first sound generation device 1200, a second sound generation device 1200', and a supporting member 300. The supporting member 300 may support one or more of a rear surface and a side surface of a display panel 100. The supporting member 300 may be a plate member, e.g., a metal or plastic material, over a rear surface of the display panel 100, around, or on an entire surface of the display panel 100.

The sound generation devices 1200 and 1200' may be accommodated in a supporting hole 310 of the supporting member 300. If the sound generation devices 1200 and 1200' is inserted into and fixed to the supporting hole 310, it is possible to decrease or reduce a height of the sound generation devices 1200 and 1200' between the rear surface of the display panel 100 and an inner surface of the supporting member 300, to thereby realize a relatively small space or region for generating the sound.

For example, the display apparatus may include a nut 330 fixed to the supporting member 300. The fixing device 1000 may be fixed to the nut 330 by a screw 320 inserted into a mounting hole of the fixing device 1000. For example, a screw-through hole may be provided in an inner surface of the nut 330. Thus, after a mounting hole of the fixing device 1000 is aligned with the screw-through hole of the nut 330, the fixing device 1000 may be fixed to the supporting member 300 by fastening (or tightening) the screw 320.

In one example, the nut 330 may be a self-clinching nut. An example of the self-clinching nut may be a PEM® nut, although embodiments are not limited thereto. If the self-clinching nut is used, some of a vibration generated in the first sound generation device 1200 and the second sound generation device 1200' may be absorbed by the self-clinching nut. Thus, a vibration transferred to the supporting member 300 may be reduced.

In the display apparatus according to an embodiment of the present disclosure, the supporting member and the sound generation device may be fixed to each other by the use of nut and screw included in the supporting member. Thus, a thickness of the display panel 100 can be reduced.

An adhesive member 400 may be in a periphery of each of the display panel 100 and the supporting member 300, and may attach the display panel 100 to the supporting member 300. The adhesive member 400 may include a double-sided tape, a single-sided tape, an adhesive, a bond, and/or the like, although embodiments are not limited thereto.

Figure 6:
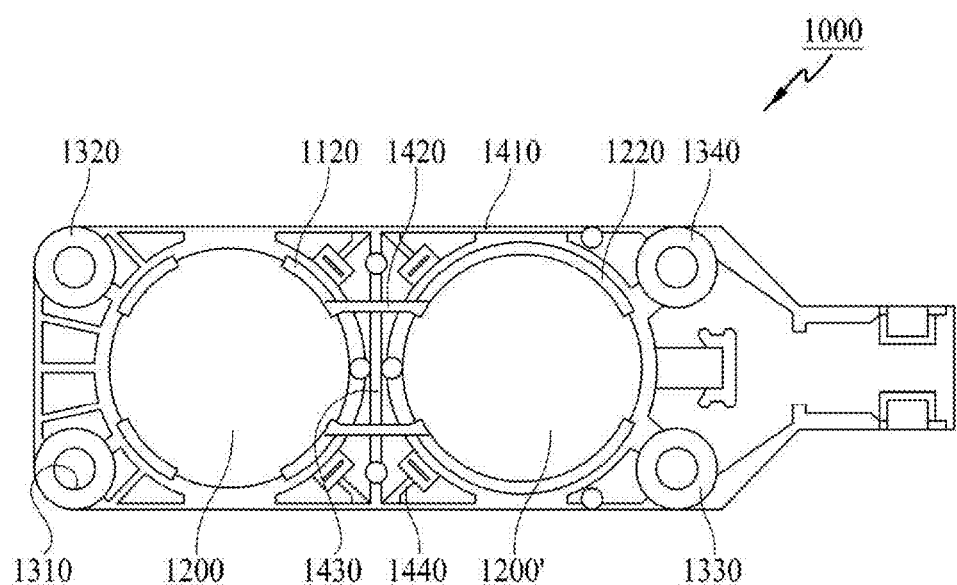
FIG. 6 illustrates a sound generation device according to another example embodiment of the present disclosure.

FIG. 6 illustrates a sound generation device according to another example embodiment of the present disclosure.

With reference to FIG. 6, the fixing device 1000 of the sound generation device may be an integrated fixing device for supporting and fixing the first sound generation device 1200 and a second generation device 1200' to be adjacent to each other. Therefore, the first sound generation device 1200 and the second generation device 1200' fixed by the fixing device 1000 may be referred to as a pair of sound generation devices, and hereinafter, will be described as a pair of sound generation devices.

The fixing device 1000 of the sound generation device may include a supporting part that may support the sound generation devices 1200 and 1200', a plurality of rib parts near the sound generation devices 1200 and 1200', and a plurality of mounting holes for fixing the fixing device 1000 to the supporting member 300. For example, the supporting part may include a first supporting part 1120 for supporting the first sound generation device 1200 and a second supporting part 1220 for supporting the second generation device 1200'. The first supporting part 1120 may be a structure for supporting a portion of each of a side surface and a rear surface of the first sound generation device 1200, and may have a cylindrical shape, and the second supporting part 1220 may be a structure for supporting a portion of each of a side surface and a rear surface of the second generation device 1200', and may have a cylindrical shape.

Each of the first supporting part 1120 and the second supporting part 1220 may further include two or four arc-shaped protrusions. One surface of each of the protrusions may be bent toward an inner side of each of the first and second sound generation devices 1200 and 1200', and may support a portion of a rear surface of each of the first and second sound generation devices 1200 and 1200', thereby reducing or preventing the first and second sound generation devices 1200 and 1200' from deviating to the outside of the fixing device 1000 of the sound generation device.

A plurality of rib parts may be near the first supporting part 1120 and the second supporting part 1220 for maintaining a rigidity of the fixing device 1000 of the sound generation device and preventing the fixing device 1000 of the sound generation device from being deformed even when being used for a long time. For example, the rib parts may include a first rib part 1410 extending in a widthwise direction from an outer portion of each of the first and second supporting parts 1120 and 1220, a second rib part 1420 connecting the first supporting part 1120 to the second supporting part 1220 in the widthwise direction, and a third rib part 1430 connected to the first rib part 1410 in a lengthwise direction. Here, the widthwise direction may be a direction toward a long side on which two sound generation devices are disposed, and the lengthwise direction may be a direction vertical or perpendicular to the widthwise direction. The first rib part 1410 may long extend in a vertical direction from the outer portion of each of the first and second supporting parts 1120 and 1220 to form a widthwise-direction outer structure of the fixing device 1000 of the sound generation device.

In a center region (e.g., a center region between the first supporting part 1120 and the second supporting part 1220) of the first rib part 1410, the first rib part 1410 may be provided greater in height and thickness than both side areas of the first rib part 1410. Therefore, even when a pair of sound generation devices vibrates for a long time, a fixing device of the pair of sound generation devices may not be deformed, and a change in the relative position between the pair of sound generation devices and the display panel may be reduced.

One or more second rib parts 1420, where the first supporting part 1120 and the second supporting part 1220 are located, may be connected to each other as one body. The one or more second rib parts 1420 may be disposed inside the first rib part 1410. In the FIG. 6 example, two of the second rib parts 1420 are illustrated as being provided, but embodiments are not limited to this configuration. For example, one, three, or more of the second rib part 1420 may be provided.

One or more third rib parts 1430, connected to the first and second rib parts 1410 and 1420 as one body and extend in the widthwise direction, may be provided between two second rib parts 1420 or between two first rib parts 1410. In the FIG. 6 example, a structure in which one third rib part 1430 is provided and extends a long distance or in a lengthwise direction between two first rib parts 1410 is illustrated. However, embodiments are not limited to this configuration. For example, the third rib part 1430 may extend a shorter distance between two of the second rib parts 1420.

One or more fourth rib parts 1440, obliquely extending between the first supporting part 1120 or the second supporting part 1220 and the first rib part 1410, may be further provided. The fourth rib part 1440 may reduce or prevent the bending deformation of the fixing device 1000 of the sound generation device caused by long-time driving of the sound generation device. Therefore, because the display apparatus according to an example embodiment of the present disclosure includes the fixing device fixing the pair of sound generation devices and the plurality of rib parts near the sound generation devices, the rigidity of the sound generation devices is maintained, and a sound characteristic change caused by a long-time operation is reduced.

Moreover, a separation distance between the first supporting part 1120 and the second supporting part 1220 may be greater than a minimum threshold value that may enable formation of the rib part, and may be smaller than a maximum threshold value corresponding to a diameter of each of the first sound generation device 1200 and the second sound generation device 1200'. If the separation distance between the first supporting part 1120 and the second supporting part 1220 is equal to or greater than the minimum threshold value, the degradation in sound quality may be reduced. Therefore, the separation distance between the first supporting part 1120 and the second supporting part 1220 may be smaller than the diameter of each of the first sound generation device 1200 and the second sound generation device 1200'. Thus, the degradation in sound quality may be reduced or prevented. For example, if a size (or a diameter) of the sound generation device is "D," the distance between the first supporting part 1120 and the second supporting part 1220 may be a value larger than, e.g., about 7 mm, corresponding to an example minimum threshold value. In one example, the change in sound quality characteristic is not greater in an example in which the size D of the sound generation device is, e.g., about 28 mm, than an example in which the size D of the sound generation device is about 0.85*D (e.g., about 23.6 mm).

A plurality of mounting holes for fixing the fixing device 1000 to the supporting member 300 may be provided. When the hole is provided in the inner surface of the nut 330 illustrated in FIG. 5B, a plurality of mounting holes 1310, 1320, 1330, and 1340 of the fixing device 1000 may be aligned with the hole of the nut 330. Then, by fastening the screw 320, the fixing device 1000 may be fixed to the supporting member 300.

Figure 7:
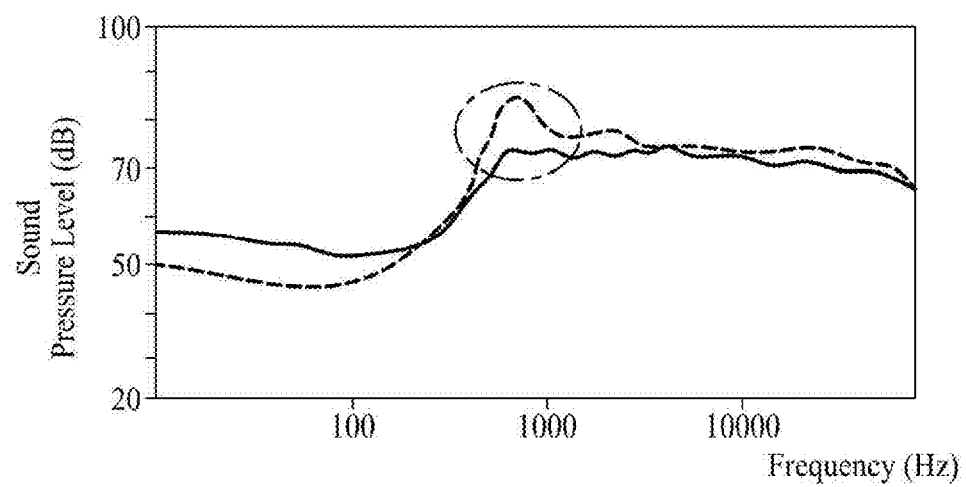
FIG. 7 illustrates a sound output characteristic of a sound generation device according to another example embodiment of the present disclosure.

FIG. 7 illustrates a sound output characteristic of a sound generation device according to another example embodiment of the present disclosure.

In FIG. 7, the abscissa axis (x-axis) represents a frequency in hertz (Hz), and the ordinate axis (y-axis) represents a sound pressure level in decibels (dB). A sound output characteristic may be measured by a sound analysis apparatus. The sound analysis apparatus may include a sound card for transmitting sound to or receiving sound from a control personal computer (PC), an amplifier for amplifying a signal generated from the sound card and transfers the amplified signal to a sound generation device, and a microphone for collecting a sound generated by the sound generation device in a display panel. The sound collected through the microphone may be input to the control PC through the sound card, and a control program may check the input sound to analyze the sound of the sound generation device.

In FIG. 7, a dotted line represents a case in which two sound generation devices spaced apart from each other are provided and fixed individually. Based on experimental results, it can be seen that a peak occurs where a sound pressure level rapidly increases in a frequency band of 800 Hz to 900 Hz (shown in a circle). In the peak, a strong sound pressure level is generated in a specific frequency due to delay or interference between sound waves generated by the two sound generation devices that are spaced apart from each other and are individually fixed. Therefore, it is recognized that sound quality is wholly degraded.

Moreover, in FIG. 7, a solid line represents a case in which a fixing device 1000 which fixes a pair of sound generation devices as one body is used as in an embodiment of the present disclosure. Based on experimental results, it can be seen that the peak, where a sound pressure level abnormally increases in a certain frequency, is considerably reduced in comparison with the dotted line case. Therefore, if a pair of sound generation devices according to another embodiment of the present disclosure is applied, it can be seen that a uniform sound pressure level is generated in a whole frequency band. Thus, a good sound output characteristic may be realized.

Moreover, a wiring for supplying a signal to a sound generation device may be desired for vibrating the sound generation device. The wiring may be exposed at a supporting member, and may be fixed by a tape and/or the like. Therefore, the inventors have recognized that, because the wiring may be exposed at the supporting member, it may be difficult to provide a good external aesthetic or a good design. Also, the inventors have recognized that, because the sound generation device may be exposed at the supporting member, it may be difficult to provide a good external aesthetic.

Therefore, the inventors have performed various experiments for implementing a hidden exciter (e.g., sound generation device) and wire structure in which the sound generation device and the wiring are covered by a rear surface. Details of the various experiments will be described below with reference to FIGS. 8A and 8B. Hereinafter, the details of the various experiments will be described with reference to a first supporting member 301, a first sound generation device 1800', a second sound generation device 1800", a supporting plate 410, a driving circuit unit 810, and a rear cover 303 by way of example, although embodiments are not limited thereto.

A wiring for supplying a signal to the first sound generation device 1800' and the second sound generation device 1800" may be between the supporting plate 410 and each of the first sound generation device 1800' and the second sound generation device 1800". For example, the supporting plate 410 may be on the first supporting member 301 without a step height, but a step height may occur between the first supporting member 301 and the supporting plate 410 due to the wiring. Also, an additional structure for hiding the wiring may be provided. Therefore, the inventors have recognized that the wiring may extend downward along an outer portion of the supporting plate 410 for a step height to not occur in the first supporting member 301. In this case, the inventors have recognized that it may be difficult to provide a good external aesthetic, and the number of manufacturing steps may increase due to the additional structure.

Moreover, a sound generation device and a wiring may be under a rear cover. For example, a supporting plate may be on a first supporting member. For example, the supporting plate and the sound generation device may be disposed in an order from an upper portion to a lower portion of a rear surface of the first supporting member. Also, the sound generation device and the wiring may be under the rear cover. When the supporting plate and the rear cover are on the rear surface of the first supporting member, an area in which the supporting plate and the rear cover are not disposed, of the rear surface of the first supporting member, may be reduced. Accordingly, because the area in which the supporting plate and the rear cover are not disposed may be reduced, the inventors have recognized that it may be difficult to realize a design having a sense of beauty or a good design in an external appearance.

Moreover, a sound generation device may be under a supporting plate. For example, because all of a wiring and the sound generation device may be hidden, the inventors have recognized that there is a problem in which a thickness or height of the supporting plate increases.

Therefore, the inventors have recognized that a design in which a sound generation device and a wiring exposed at a supporting member are hidden may be desirable for enhancing a sense of beauty in an external appearance. Also, the inventors have recognized that it is desirable to develop a design in which a wiring and a sound generation device are disposed without affecting a thickness or disposition of a supporting plate.

Therefore, the inventors have invented a display apparatus including a new sound generation device, in which a wiring and a sound generation device are on a rear surface of a supporting member without affecting a thickness or disposition of a supporting plate, and thus, a sense of beauty is not reduced. The invented display apparatus, including the new sound generation device, will be described below with reference to FIGS. 8A to 8C.

Figure 8A:
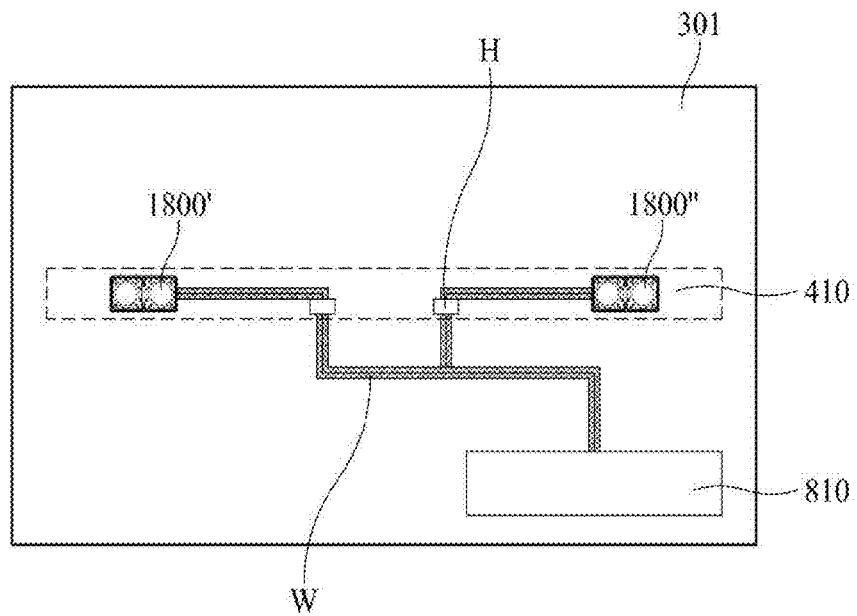
FIGS. 8A to 8C illustrate a supporting member and a rear cover according to an example embodiment of the present disclosure.
Figure 8B:
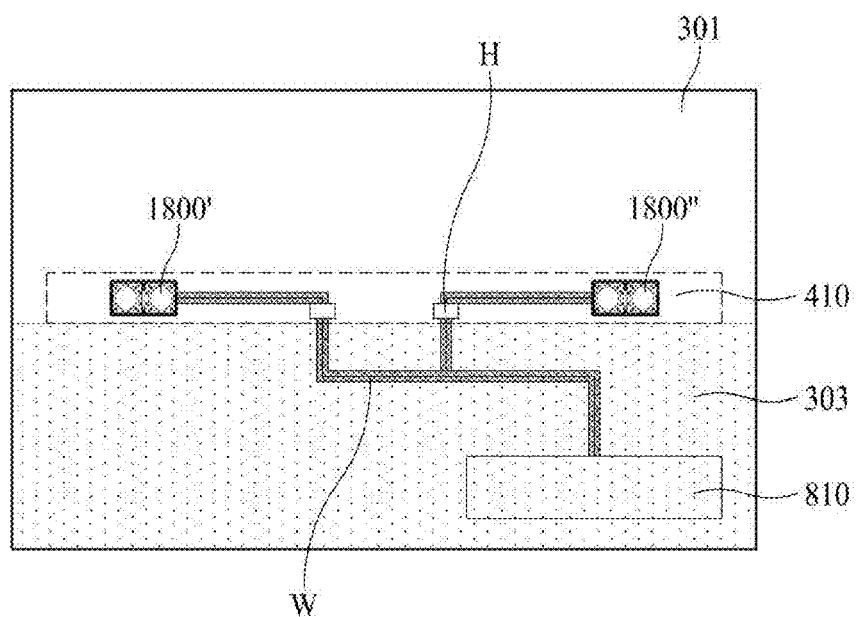
Figure 8C:
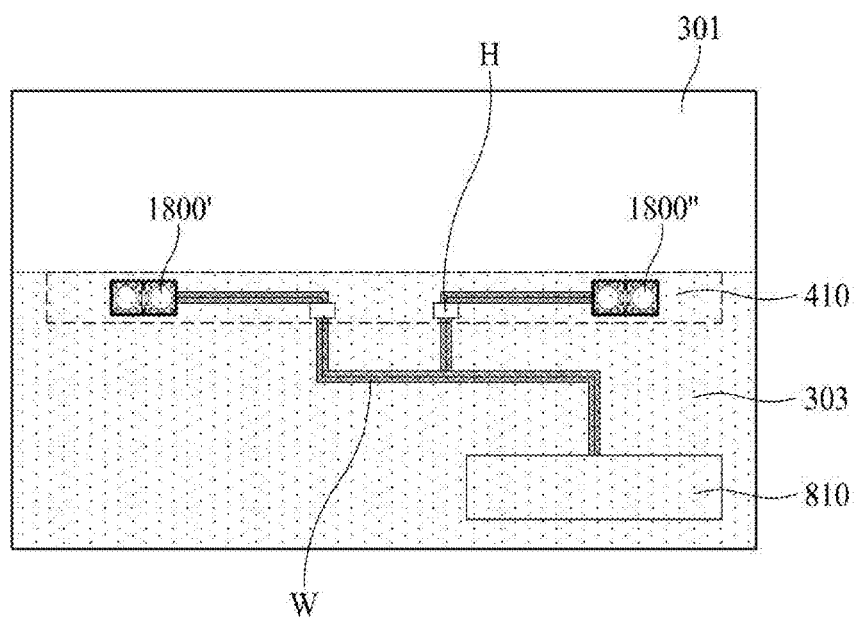
Figure 8D:
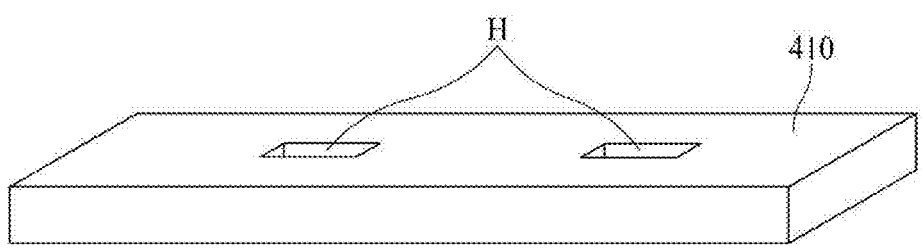
FIGS. 8D and 8E illustrate a supporting plate according to an example embodiment of the present disclosure.
Figure 8E:
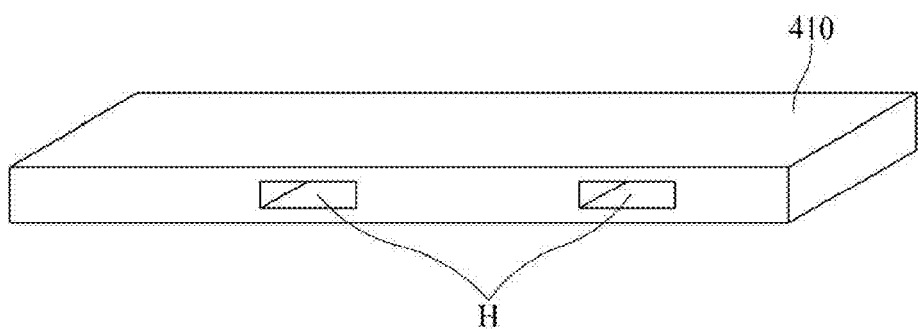

FIGS. 8A to 8C illustrate a supporting member and a rear cover according to an example embodiment of the present disclosure. FIGS. 8D and 8E illustrate a supporting plate according to an example embodiment of the present disclosure.

FIG. 8A is a diagram illustrating a rear surface of a supporting member according to an example embodiment of the present disclosure. FIGS. 8B and 8C are diagrams illustrating a rear surface of a supporting member and a rear cover according to an example embodiment of the present disclosure.

In FIGS. 8A to 8C, a pair of sound generation devices will be described as an example. The descriptions of the pair of sound generation devices may be substantially similarly applied to the single sound generation device of the FIG. 10 example, or to the two sound generation devices of the FIG. 11 example. Also, in FIGS. 8A to 8C, the structure of FIG. 2B will be described for example, but embodiments are not limited thereto. For example, the structure of FIG. 2A may be substantially similarly applied. FIGS. 8D and 8E are diagrams illustrating a hole in a supporting plate.

With reference to FIG. 8A, a first sound generation device 1800' and a second sound generation device 1800" may be in a first supporting member 301. A wiring W for supplying a signal may be in each of the first sound generation device 1800' and the second sound generation device 1800" for vibrating the first sound generation device 1800' and the second sound generation device 1800". The wiring W may be supplied with the signal from a driving circuit unit 810, and thus, may be connected to the driving circuit unit 810.

The first sound generation device 1800' and the second sound generation device 1800" may be respectively in a left region and a right region of the first supporting member 301. It should be appreciated that "left" and "right" are interchangeable, as would be understood to one of ordinary skill in the art. The first supporting member 301 may be the supporting member described above with reference to the examples of FIGS. 1 to 6. The first supporting member 301 may be referred to as a back cover.

A supporting plate 410 may be on a rear surface of the first supporting member 301. The supporting plate 410 may provide rigidity to a display panel, and may reduce or prevent twisting or bending of the display panel. The supporting plate 410 may be in a circle shape or a polygonal shape, such as a tetragonal shape (e.g., a square or rectangle) or the like, but embodiments are not limited thereto. The supporting plate 410 may be referred to as a "rigid plate."

The driving circuit unit 810 or a main board including at least one printed circuit board (PCB) may be disposed in a lower portion of the first supporting member 301. The driving circuit unit 810 may provide an interface that may enable a display panel to operate.

The at least one PCB may be a power supply. The power supply may supply power to the display panel. For example, the power supply may convert an alternating current (AC) frequency into a direct current (DC) frequency.

The at least one PCB may be a timing controller board. The timing controller board may transfer an input signal to the display panel. For example, the timing controller board may transfer, to a source PCB, timing signals for controlling the source PCB and a video signal. Also, the timing controller board may control an image. The timing controller board may be connected to the source PCB by using one of a flat flex cable (FFC), a circular cable, and wireless transmission. For example, the timing controller board may include a controller for controlling operations of a data driver and a gate driver and a power management integrated circuit (IC) (PMIC) that may supply various voltages or currents to the display panel, the data driver, and the gate driver and controls the various voltages or currents which are to be supplied.

The data driver may supply data voltages to a plurality of data lines to drive the plurality of data lines. The data driver may be referred to as a "source driver." The data driver may include at least one source driver IC, and may drive the plurality of data lines.

The source driver IC may be connected to a pad of the display panel in a tape automated bonding (TAB) type or a chip-on-glass (COG) type, or may be directly provided in the display panel. In some examples, the source driver IC may be integrated and provided in the display panel. Alternatively, the source driver IC may be implemented as a chip-on-plastic (COP) type or a chip-on-film (COF) type, which may be mounted on a film connected to the display panel.

The gate driver may supply a gate voltage to a plurality of gate lines to drive the plurality of gate lines. The gate driver may be referred to as a "scan driver." The gate driver may include at least one gate driver IC, and may drive the plurality of gate lines.

The at least one source driver IC may be mounted on the source PCB, or the source PCB may be connected to a COF on which the at least one source driver IC may be mounted. The source PCB may be connected to the display panel and the COF, and may be disposed on a lower rear surface of the display panel.

The wiring W, for applying the signal to the first sound generation device 1800' and the second sound generation device 1800", may transfer the signal through a step height in each of the first sound generation device 1800' and the second sound generation device 1800". The wiring W, through which the signal may be applied, may extend to the first supporting member 301 through a hole H provided in the supporting plate 410. Also, the wiring W extending to the first supporting member 301 may be connected to the driving circuit unit 810.

The hole H of the supporting plate 410, as illustrated in FIG. 8D, may be in an upper surface of the supporting plate 410. As illustrated in FIG. 8E, the hole H of the supporting plate 410 may be on a side surface of the supporting plate 410. If the hole H is in the side surface of the supporting plate 410, a step height between the first supporting member 301 and the supporting plate 410, caused by the wiring W extending to the hole H, may be reduced. The number of holes may be set based on the number of sound generation devices, and the number of the holes does not limit details of embodiments of the present disclosure.

Therefore, the first sound generation device 1800', the second sound generation device 1800", and the wiring W may be hidden by the supporting plate 410. Thus, a portion of each of the first and second sound generation devices 1800' and 1800" and the wiring W seen at the first supporting member 310 may be hidden. Therefore, a hole may be in a supporting plate, and a wiring for applying a signal to a sound generation device may extend through the hole, whereby a portion of the wiring hidden by the supporting plate may correspond to a width of the sound generation device. Accordingly, a problem in which a thickness or height of the supporting plate increases may be solved. Therefore, if the sound generation device and the wiring extending to the sound generation device are hidden by the supporting plate, the problem of the thickness or height of the supporting plate increasing may be solved. An area, in which the supporting plate and a rear cover are not disposed, of a rear surface of the supporting member may be maintained, thereby providing a display apparatus having a sense of beauty in an external appearance.

With reference to FIG. 8B, the wiring W extending through the hole H may be connected to the driving circuit unit 810. The driving circuit unit 810 and the wiring W connected to the driving circuit unit 810 may be hidden by a rear cover 303. When the wiring W extending through the hole H and the driving circuit unit 810 are hidden by the rear cover 303, a sense of beauty in external appearance may be enhanced, despite the wiring W extending to a rear surface of the first supporting member 301. The wiring W extending through the hole H of the supporting plate 410 may be hidden by the rear cover 303, thereby solving a problem if an additional structure for hiding the wiring W being when the wiring W is disposed along an outer side of the supporting plate 410, Therefore, the first sound generation device 1800', the second sound generation device 1800", the wiring W, and a portion of the wiring W extending through the hole H may be covered by the supporting plate 410 and the rear cover 303. Thus, the wiring W and a sound generation device may not be exposed at a rear surface of a supporting member, thereby providing a display apparatus with an enhanced sense of beauty. Accordingly, the hidden exciter and wire structure may be implemented, thereby providing a display apparatus having a clean-looking design.

Moreover, embodiments are not limited to the example of FIG. 8B. For example, the supporting plate 410 may be hidden by the rear cover 303. With reference to FIG. 8C, the supporting plate 410, covering the first and second sound generation devices 1800' and 1800" and the wiring W and a portion of the wiring W extending through the hole H, may be covered by the rear cover 303. The driving circuit unit 810 and the wiring W connected to the driving circuit unit 810 may be covered by the rear cover 303. Therefore, when a sound generation device, a wiring, a supporting plate, and a portion of the wiring extending through a hole are covered by a rear cover, the hidden exciter and wire structure may be implemented, thereby providing a display apparatus having a clean-looking design. Because various circuit boards, in addition to the driving circuit unit, may be disposed on a rear surface of a supporting member, it may be difficult to dispose a sound generation device. Therefore, when a hole is in the supporting plate and a portion of the wiring extending to the rear surface of the supporting member through the hole are covered by the rear cover, a width of each of the sound generation device and a portion of the wiring hidden by the supporting plate may be reduced, thereby solving a problem in which a thickness or height of the supporting plate increases. Accordingly, the thickness or height of the supporting plate may not increase, thereby solving a problem in which disposition of a sound generation device may be affected when the sound generation device is disposed under a rear cover. Therefore, a problem may be solved in which it may be difficult to realize a sense of beauty due to a limitation of the thickness or height of the supporting plate or disposition of the sound generation device.

Therefore, the first sound generation device 1800', the second sound generation device 1800", the wiring W, and a portion of the wiring W extending through the hole H may be covered by the supporting plate 410 and the rear cover 303. Thus, the wiring W and a sound generation device may not be exposed at the rear surface of the supporting member, thereby providing a display apparatus with an enhanced sense of beauty. Accordingly, the hidden exciter and wire structure may be implemented, thereby providing a display apparatus having a clean-looking design.

Descriptions of the first sound generation device 1800' and the second sound generation device 1800" are substantially similar to descriptions given above with reference to the examples of FIGS. 5A to 7. Thus, duplicate descriptions are omitted.

According to some embodiments of the present disclosure, a bobbin or a voice coil of a sound generation device may be configured in a circular shape or an oval shape. If the bobbin or the voice coil is configured in an oval shape, a sound having a high-pitched sound band is improved in comparison with a circular shape, and the occurrence of heat caused by a vibration of the bobbin or the voice coil may be reduced, thereby enhancing a heat dissipation characteristic.

Moreover, according to some embodiments of the present disclosure, a sound generation device including two sound generation devices may be provided, and a signal or a current applied to the sound generation device may be divided into two signals or two currents, thereby reducing the occurrence of heat caused by a vibration of the sound generation device. Therefore, the occurrence of heat may be reduced, and thus, reliability may be enhanced. Also, when the sound generation device including the two sound generation devices is provided, a sound output characteristic may be doubly improved, thereby enhancing a sound pressure. Also, the sound generation device including the two sound generation devices may be provided in at least two of a first region, a second region, and a third region. Thus, two sub-sound generation devices corresponding to each of the first to third regions may output sounds having the same sound band, thereby increasing a sound pressure level. Moreover, when the sound generation device including the two sound generation devices is provided, a size of the sound generation device may be reduced in comparison with a pair of sound generation devices, thereby providing a display apparatus including a slimmer sound generation device.

FIG. 9 illustrates a display apparatus according to an example embodiment of the present disclosure.

In FIG. 9, an example in which the display apparatus includes the first sound generation device of the FIG. 8A example will be described for convenience of explanation. FIG. 9 illustrates a pair of sound generation devices as an example, but embodiments are not limited thereto. For example, a display apparatus including a sound generation device illustrated in the examples of FIGS. 14A to 19F may be applied.

With reference to FIG. 9, a pair of first sound generation devices 1800' may include a 1-1$^{st}$ sound generation device 1800'-1 and a 1-2$^{nd}$ sound generation device 1800'-2. The 1-1$^{st}$ sound generation device 1800'-1 and the 1-2$^{nd}$ sound generation device 1800'-2 may each include a magnet 620 on a first plate 610, a center pole 630 on the magnet 620, a bobbin 650 near the magnet 620 and the center pole 630, and a coil 660 wound around the bobbin 650. A second plate 610' may be near the first plate 610, and a frame 640 may be outside the second plate 610'. A damper 670 may be between the frame 640 and the bobbin 650. A description of each of the pair of first sound generation devices 1800' is substantially similar to the description given above with reference to the FIG. 2B example, and thus, is not repeated. In FIG. 9, the second structure of the FIG. 2B example is illustrated, but the first structure of the FIG. 2A example may also be similarly applied.

The 1-1$^{st}$ sound generation device 1800'-1 and the 1-2$^{nd}$ sound generation device 1800'-2 may be fixed by a fixing device 1000. A description of the fixing device 1000 is the substantially similar to the description given above with reference to the FIG. 6 example, and thus, is not repeated.

A supporting plate 410 may be under the 1-1$^{st}$ sound generation device 1800'-1 and the 1-2$^{nd}$ sound generation device 1800'-2. A hole H may be provided, through which a wiring W for applying a signal to the 1-1$^{st}$ sound generation device 1800'-1 and the 1-2$^{nd}$ sound generation device 1800'-2 may extend.

A diameter enlargement part 614 may be provided as one body with the first plate 610 of each of the 1-1$^{st}$ sound generation device 1800'-1 and the 1-2$^{nd}$ sound generation device 1800'-2. The first plate 610 of each of the 1-1$^{st}$ sound generation device 1800'-1 and the 1-2$^{nd}$ sound generation device 1800'-2 may have a cylindrical shape, and a protrusion may be provided on one side of the first plate 610. For example, the protrusion may be greater than a diameter of the other portion of the first plate 610. A protrusion region having an enlarged diameter may be referred to as a diameter enlargement part 614. The diameter enlargement part 614 may be provided in a ring shape. An extension part 612 for fixing the 1-1$^{st}$ sound generation device 1800'-1 and the 1-2$^{nd}$ sound generation device 1800'-2 may be provided in a portion of the diameter enlargement part 614.

A terminal 617, connected to the wiring W for applying the signal to the 1-1$^{st}$ sound generation device 1800'-1 and the 1-2$^{nd}$ sound generation device 1800'-2, may be provided in the extension part 612. The extension part 612 may extend from the first plate 610 and may be formed through an injection molding process.

A screw 320 and a nut 330 may be provided in the extension part 612. The nut 330 may be, for example, a self-clinching nut. An example of the self-clinching nut may include a PEM® nut. The 1-1$^{st}$ sound generation device 1800'-1 and the 1-2$^{nd}$ sound generation device 1800'-2 may be fixed to a first supporting member 301 by the nut 330 and the screw 320.

An adhesive member 400 may be provided for attaching the display panel 100 on the first sound generation device 1800'. The adhesive member 400 may include, for example, a double-sided tape, a single-sided tape, an adhesive, a bond, and/or the like, but embodiments are not limited thereto. As illustrated in FIG. 9, the adhesive member 400 may be in a portion in which each of the 1-1$^{st}$ sound generation device 1800'-1 and the 1-2$^{nd}$ sound generation device 1800'-2 is attached to the display panel 100, but embodiments are not limited thereto. For example, the adhesive member 400 may be on a whole rear surface of the display panel 100. For example, the adhesive member 400 may be on a whole surface between the display panel 100 and each of the 1-1$^{st}$ sound generation device 1800'-1 and the 1-2$^{nd}$ sound generation device 1800'-2.

Figure 10:
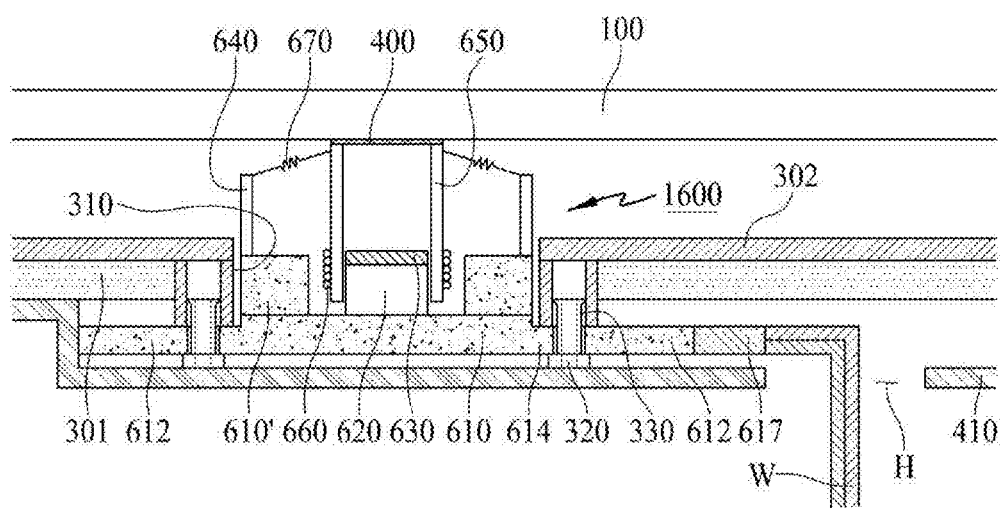
FIG. 10 illustrates a display apparatus according to another example embodiment of the present disclosure.

FIG. 10 illustrates a display apparatus according to another example embodiment of the present disclosure.

FIG. 10 illustrates one sound generation device as an example, but embodiments are not limited thereto. For example, a display apparatus including a sound generation device illustrated in the examples of FIGS. 14A to 19F may be similarly applied.

With reference to FIG. 10, a sound generation device 1600 may include a magnet 620 on a first plate 610, a center pole 630 on the magnet 620, a bobbin 650 near the magnet 620 and the center pole 630, and a coil 660 wound around the bobbin 650. A second plate 610' may be near the first plate 610, and a frame 640 may be outside the second plate 610'. A damper 670 may be between the frame 640 and the bobbin 650. A description of the sound generation device 1600 is substantially similar to the description given above with reference to the examples of FIGS. 2A and 2B, and thus, is not repeated. In FIG. 10, the second structure of the FIG. 2B example is illustrated, and the first structure of the FIG. 2A example may be similarly applied.

A supporting plate 410 may be under the sound generation device 1600. A hole H may be provided, through which a wiring W for applying a signal to the sound generation device 1600 may extend.

A diameter enlargement part 614 may be provided as one body with the first plate 610 of the sound generation device 1600. The first plate 610 of the sound generation device 1600 may have a cylindrical shape, and a protrusion may be on one side of the first plate 610. For example, the protrusion may be greater than a diameter of the other portion of the first plate 610. A protrusion region having an enlarged diameter may be referred to as a diameter enlargement part 614. The diameter enlargement part 614 may be provided in a ring shape. An extension part 612 for fixing the sound generation device 1600 may be provided in a portion of the diameter enlargement part 614.

A terminal 617, connected to the wiring W for applying the signal to the sound generation device 1600, may be provided in the extension part 612. The extension part 612 may extend from the first plate 610, and may be formed through an injection molding process.

A screw 320 and a nut 330 may be provided in the extension part 612. The nut 330 may be, for example, a self-clinching nut. An example of the self-clinching nut may include a PEM® nut. The sound generation device 1600 may be fixed to a first supporting member 301 by the nut 330 and the screw 320.

If the self-clinching nut is used for connected the first supporting member 301 to the sound generation device 1600, some of a vibration generated by the sound generation device 1600 may be absorbed by the self-clinching nut. Thus, a vibration transferred to the first supporting member 301 may be reduced. When the first supporting member 301 is directly connected to the sound generation device 1600 without the self-clinching nut, a vibration occurring when the sound generation device 1600 operates may be transferred to the first supporting member 301 for a long time. Thus, if the first supporting member 301 is thinly provided, the first supporting member 301 may be bent or deformed. Also, when the first supporting member 301 is thin, when the sound generation device 1600 is directly connected to the screw 320 of the first supporting member 301, a fixing force between the first supporting member 301 and the sound generation device 1600 may not be sufficient.

Therefore, when a nut is provided for fixing a sound generation device to a supporting member, a thickness of the supporting member may be thickened for reducing of preventing the bending or deformation of the supporting member, and for enhancing a fixing force between the supporting member and the sound generation device. When the thickness of the supporting member is thickened, a thickness of a display apparatus may be thickened. Also, if the supporting member is formed of glass or stainless steel, e.g., for improving an external design of the display device, a nut may not be able to be inserted into the supporting member.

Therefore, a second supporting member 302 may be further provided on the first supporting member 301 for the nut 330 to be inserted into the first supporting member 301. The second supporting member 302 may be closer to the display panel 100 than the first supporting member 301.

Moreover, the second supporting member 302 may be formed of a metal material, and the nut 330 may be inserted into the second supporting member 302. The sound generation device 1600 may be connected to the first supporting member 301 and the second supporting member 302 by the screw 320 by using the nut 330 fixed to the first supporting member 301. Also, the first supporting member 301 and the second supporting member 302 may be fixed by an adhesive member. The adhesive member may include a double-sided tape, a single-sided tape, an adhesive, a bond, and/or the like, but embodiments are not limited thereto. The second supporting member 302 may include, for example, aluminum (Al), which is a metal material, but embodiments are not limited thereto. Moreover, the second supporting member 302 may be referred to as an inner plate.

The first supporting member 301 may be formed of, e.g., glass, stainless steel, and/or the like. Thus, an aesthetic design appearance of a display apparatus may be improved. The second supporting member 302 may be further provided. Thus, the sound generation device 1600 may be closer to a front surface of the display panel 100 by a distance corresponding to a thickness of the first supporting member 301, thereby reducing a thickness of the display device. Therefore, the second supporting member 302 may be further provided. Thus, the sound generation device may be thinner, thereby reducing the thickness of the display device. When the second supporting member 302 is further provided, the thickness of the display apparatus may be reduced, thereby solving a problem in which a thickness or height of a supporting plate covering the sound generation device increases. Accordingly, the sound generation device and a wiring may be under the supporting plate, thereby providing a display apparatus having a sense of beauty in external appearance. The second supporting member 302 may be similarly applied to the sound generation device of the example of FIG. 9.

An adhesive member 400 for attaching the sound generation device 1600 to the display panel 100 may be provided. The adhesive member 400 may include a double-sided tape, a single-sided tape, an adhesive, a bond, and/or the like, but embodiments are not limited thereto. Also, as in the FIG. 10 example, the adhesive member 400 may be in a portion in which the sound generation device 1600 is attached to the display panel 100, but embodiments are not limited thereto. The adhesive member 400 may be on a whole rear surface of the display panel 100. For example, the adhesive member 400 may be on a whole surface between the display panel 100 and the sound generation device 1600.

Figure 11:
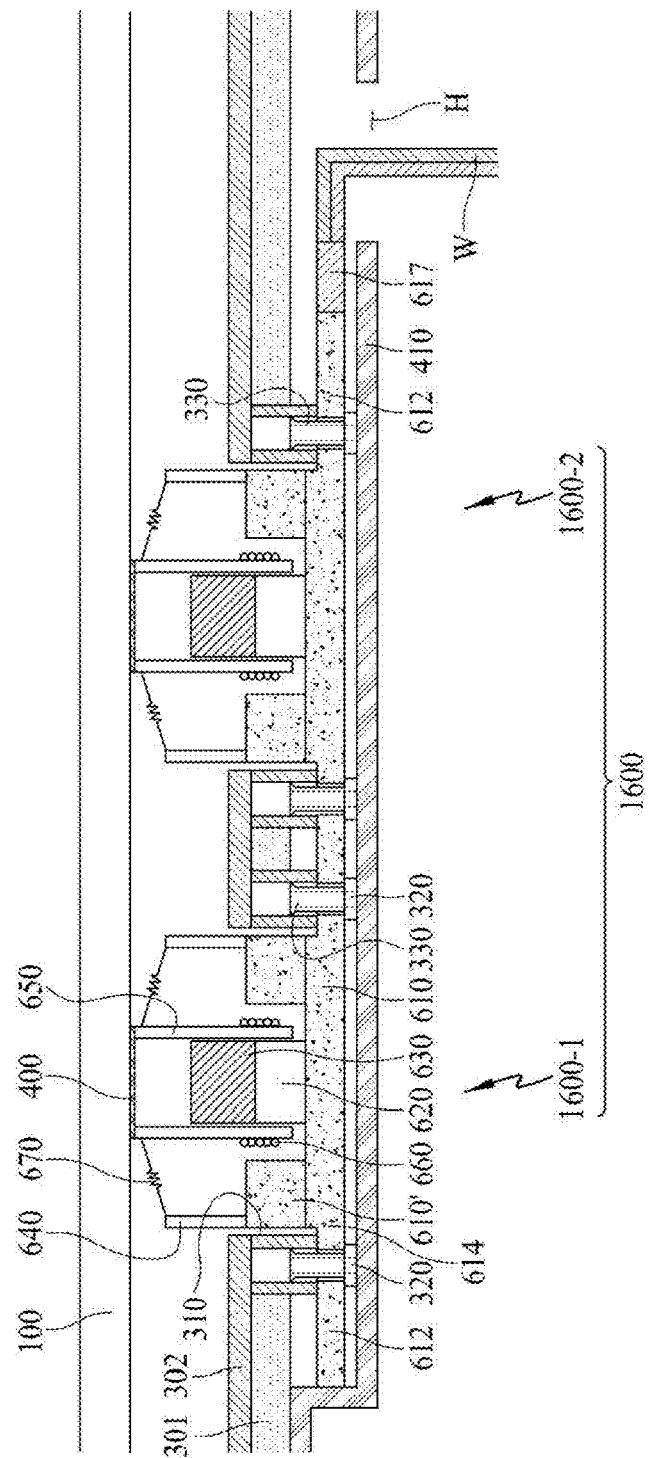
FIG. 11 illustrates a display apparatus according to another example embodiment of the present disclosure.

FIG. 11 illustrates a display apparatus according to another example embodiment of the present disclosure.

FIG. 11 illustrates two sound generation devices as an example, but embodiments are not limited thereto. For example, a display apparatus including a sound generation device illustrated in the examples of FIGS. 14A to 19F may be applied. The two sound generation devices may be disposed adjacent to each other.

With reference to FIG. 11, a 1-1$^{st}$ sound generation device 1600-1 and a 1-2$^{nd}$ sound generation device 1600-2, which may configure a sound generation device 1600, may each include a magnet 620 on a first plate 610, a center pole 630 on the magnet 620, a bobbin 650 near the magnet 620 and the center pole 630, and a coil 660 wound around the bobbin 650. A second plate 610' may be near the first plate 610, and a frame 640 may be outside the second plate 610'. A damper 670 may be between the frame 640 and the bobbin 650. A description of the sound generation device 1600 is substantially similar to the description given above with reference to FIG. 2, and thus, is not repeated.

In FIG. 11, the second structure of the FIG. 2B example is illustrated, but the first structure of the FIG. 2A example may also be similarly applied.

A supporting plate 410 may be under the sound generation device 1600. A hole H may be provided, through which a wiring W for applying a signal to the sound generation device 1600 may extend.

A diameter enlargement part 614 may be provided as one body with the first plate 610 of each of the 1-1$^{st}$ sound generation device 1600-1 and the 1-2$^{nd}$ sound generation device 1600-2. The first plate 610 of the sound generation device 1600 may have a cylindrical shape, and a protrusion may be on one side of the first plate 610. For example, the protrusion may be greater than a diameter of the other portion of the first plate 610. A protrusion region having an enlarged diameter may be referred to as a diameter enlargement part 614. The diameter enlargement part 614 may be in a ring shape. An extension part 612 for fixing the 1-1$^{st}$ sound generation device 1600-1 and the 1-2$^{nd}$ sound generation device 1600-2 may be provided in a portion of the diameter enlargement part 614.

A terminal 617, connected to the wiring W for applying the signal to the sound generation device 1600, may be in the extension part 612. The extension part 612 may extend from the first plate 610, and may be formed through an injection molding process.

A screw 320 and a nut 330 may be provided in the extension part 612. The nut 330 may be, for example, a self-clinching nut. An example of the self-clinching nut may include a PEM® nut. The 1-1$^{st}$ sound generation device 1600-1 and the 1-2$^{nd}$ sound generation device 1600-2 may be fixed to a first supporting member 301 by the nut 330 and the screw 320.

A second supporting member 302 may be on the first supporting member 301. A description of the second supporting member 302 is substantially similar to the description given above with reference to the example of FIG. 10, and thus, is not repeated.

An adhesive member 400 for attaching the sound generation device 1600 to the display panel 100 may be provided. The adhesive member 400 may include a double-sided tape, a single-sided tape, an adhesive, a bond, and/or the like, but embodiments are not limited thereto. Also, as illustrated in FIG. 11, the adhesive member 400 may be in a portion in which the sound generation device 1600 is attached to the display panel 100, but embodiments are not limited thereto. The adhesive member 400 may be on a whole rear surface of the display panel 100. For example, the adhesive member 400 may be on a whole surface between the display panel 100 and the sound generation device 1600.

Figure 12:
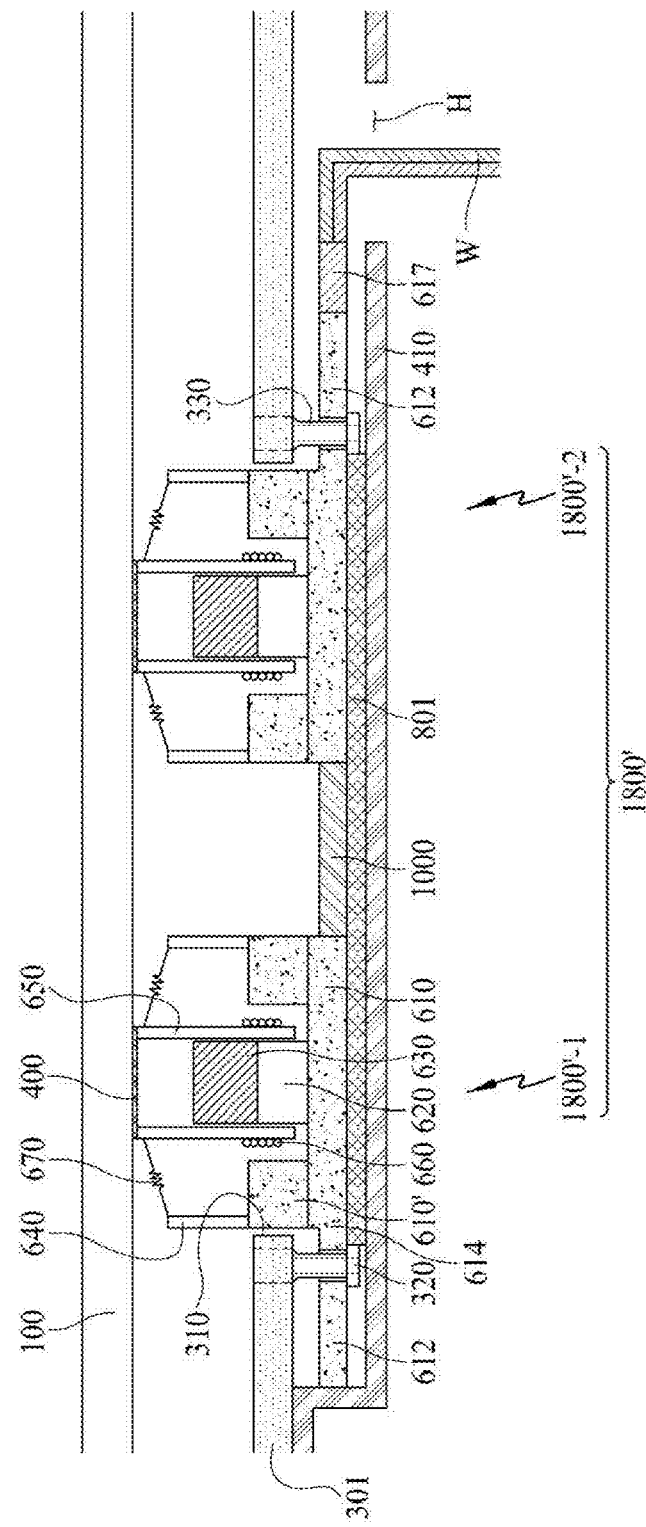
FIG. 12 illustrates a display apparatus according to another example embodiment of the present disclosure.

FIG. 12 illustrates a display apparatus according to another example embodiment of the present disclosure.

FIG. 12 illustrates a pair of sound generation devices as an example, and may be similarly applied to the display apparatus of FIGS. 10 and 11. A display apparatus including a sound generation device illustrated in the examples of FIGS. 14A to 19F may be similarly applied.

With reference to FIG. 12, a pair of first sound generation devices 1800' may include a 1-1$^{st}$ sound generation device 1800'-1 and a 1-2$^{nd}$ sound generation device 1800'-2. The 1-1$^{st}$ sound generation device 1800'-1 and the 1-2$^{nd}$ sound generation device 1800'-2 may each include a magnet 620 on a first plate 610, a center pole 630 on the magnet 620, a bobbin 650 near the magnet 620 and the center pole 630, and a coil 660 wound around the bobbin 650. A second plate 610' may be near the first plate 610, and a frame 640 may be outside the second plate 610'. A damper 670 may be between the frame 640 and the bobbin 650. A description of each of the pair of first sound generation devices 1800' is substantially similar to the description given above with reference to the example of FIG. 2, and thus, is not repeated. Also, other elements are substantially similar to those of the example of FIG. 9, and thus, a detailed description is omitted. The second supporting member described above with reference to the examples of FIGS. 9 and 10 may be similarly applied to the example of FIG. 12.

With reference to FIG. 12, a pad 801 may be between a supporting plate 410 and the first sound generation device 1800'. The pad 801 may dissipate heat, e.g., caused by a vibration of the first sound generation device 1800', to the supporting plate 410. Therefore, because the heat caused by the vibration of the first sound generation device 1800' is reduced or prevented from flowing into the display panel 100, the image quality of the display panel 100 may be reduced or prevented from being degraded by heat occurring when a sound generation device is driven.

The pad 801 may contact the first plate 610 of the first sound generation device 1800'. Thus, an area that allows heat to be dissipated may be enlarged, thereby increasing a heat dissipation effect.

Moreover, the pad 801 may compensate for a step height between the first sound generation device 1800' and the supporting plate 410. The 1-1$^{st}$ sound generation device 1800'-1 and the 1-2$^{nd}$ sound generation device 1800'-2 may not be uniformly provided and may not have the same thickness, thereby compensating for a step height between the 1-1$^{st}$ sound generation device 1800'-1 and the 1-2$^{nd}$ sound generation device 1800'-2. The pad 801 may be formed of, e.g., silicon, graphite, and/or the like, but embodiments are not limited thereto. Therefore, when a pad is further provided between a supporting plate and a sound generation device, heat occurring in a sound generation device may be dissipated, thereby compensating for a step height between sound generation devices.

Figure 13:
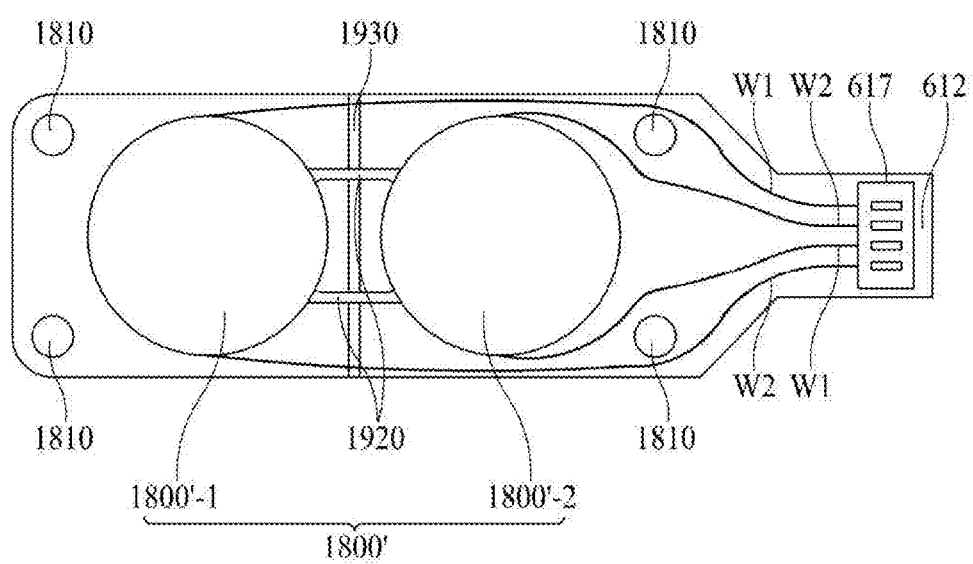
FIG. 13 illustrates a wiring of a sound generation device according to an example embodiment of the present disclosure.

FIG. 13 illustrates a wiring of a sound generation device according to an example embodiment of the present disclosure.

FIG. 13 illustrates a pair of sound generation devices as example, and may be also be similarly applied to the sound generation device of the examples of FIGS. 10 and 11.

With reference to FIG. 13, a sound supporting part may be provided that may support a pair of sound generation devices 1800', a plurality of rib parts disposed near the pair of sound generation devices 1800', and a plurality of mounting holes for fixing a fixing device and a supporting member. FIG. 13 briefly illustrates some elements described above with reference to the FIG. 6 example, and the other elements of FIG. 6 may be similarly applied to the example of FIG. 13.

A plurality of mounting holes 1810 may be aligned with a hole of a nut 330 of each of the pair of sound generation devices 1800'. Then, by fastening a screw 320, the plurality of mounting holes 1810 may fix each of the pair of sound generation devices 1800' to a first supporting member 301. One or more rib parts 1920 and 1930 may be provided near the pair of sound generation devices 1800' to reduce or prevent deformation of the pair of sound generation devices 1800'. Description other than that of the rib parts illustrated in FIG. 13 is substantially similar to the description given above with reference to the FIG. 6 example, and thus, is not repeated.

A terminal 617 may be provided in an extension part 612 of each of the pair of sound generation devices 1800'. The terminal 617 may be a connection terminal that may apply a signal to each of a 1-1$^{st}$ sound generation device 1800'-1 and a 1-2$^{nd}$ sound generation device 1800'-2 included in the pair of sound generation devices 1800'. The signal applied to each of the 1-1$^{st}$ sound generation device 1800'-1 and the 1-2$^{nd}$ sound generation device 1800'-2 may include a positive (+) signal W1 and a negative (−) signal W2. For example, the terminal 617 may include two terminals for transferring a positive (+) signal W1 and a negative (−) signal W2 applied to the 1-1$^{st}$ sound generation device 1800'-1 and two terminals for transferring a positive (+) signal W1 and a negative (−) signal W2 applied to the 1-2$^{nd}$ sound generation device 1800'-2. Also, the positive (+) signal W1 may be serially connected to the negative (−) signal W2. As described above with reference to the examples of FIGS. 8A to 8E, wirings for W1 and W2 may extend through a hole of a supporting plate.

Figure 14A:
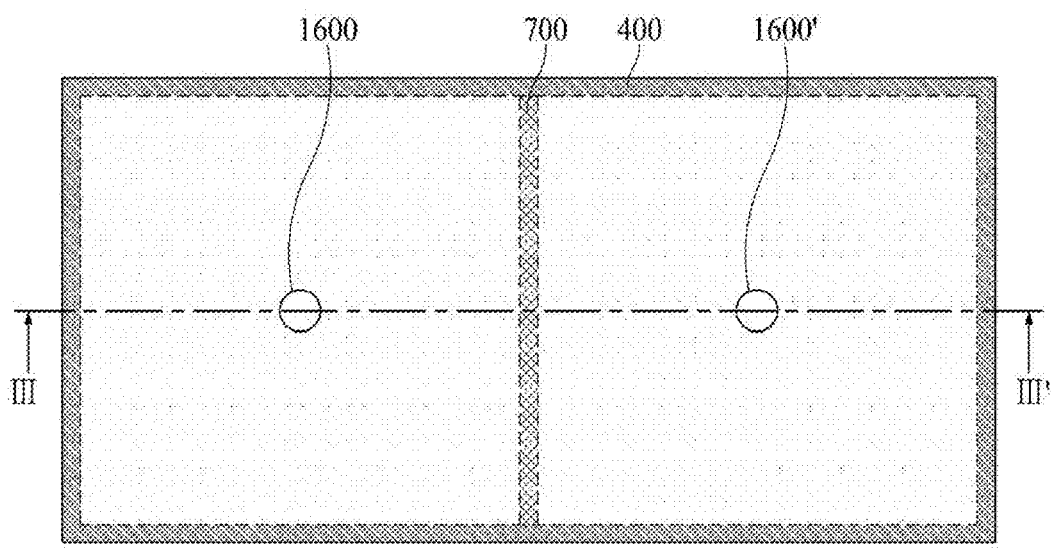
FIGS. 14A to 14C illustrate a sound generation device and a partition in a display apparatus according to an example embodiment of the present disclosure.
Figure 14B:
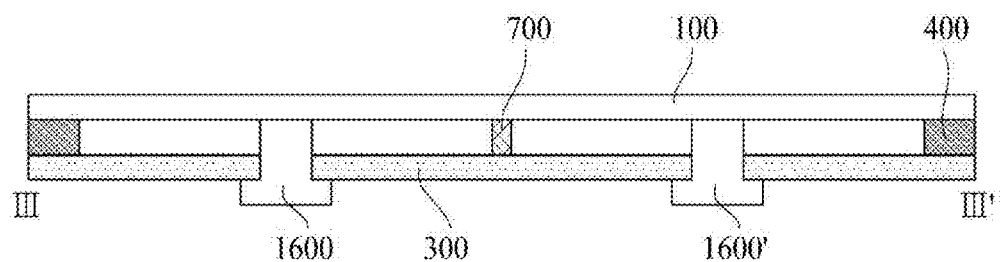
Figure 14C:
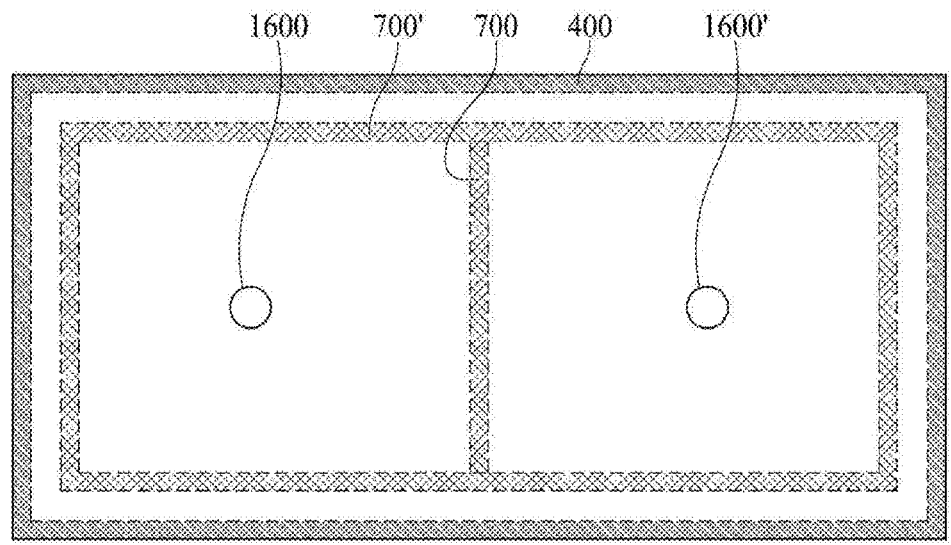

FIGS. 14A to 14C illustrate a sound generation device and a partition in a display apparatus according to an example embodiment of the present disclosure.

With reference to FIG. 14A, a display panel 100 may display an image, and may include a first region and a second region. The first region may be a left region of the display panel 100, and the second region may be a right region of the display panel 100. A first sound generation device 1600 may be in the first region of the display panel 100, and a second sound generation device 1600' may be in the second region of the display panel 100. The first sound generation device 1600 and the second sound generation device 1600' may output sounds having a middle-high-pitched sound band, and may output a stereo sound through left-right sound separation.

A partition 700 may be between the first sound generation device 1600 and the second sound generation device 1600'. The partition 700 may be a space or an air gap where a sound is generated when the display panel 100 is vibrated by the sound generation device. An air gap or a space, which may generate or transfer sound, may be referred to as a partition, or may be referred to as an enclosure or a baffle, but the term is not limited thereto. The partition 700 may be a whole region of four outer sides of the display panel 100 or a supporting member 300. The partition 700 may have a sealed structure, or may have an unsealed structure.

The partition 700 may respectively separate left sound and right sound generated by the first sound generation device 1600 and the second sound generation device 1600'. A vibration of the display panel 100 performed in a space or an air gap defined as the partition 700 may be attenuated or absorbed by a center of the display panel 100. Thus, sound in the left region may not be transferred to a space of the right region. Therefore, when the partition 700 is provided, the left sound and the right sound may be separated from each other. Thus, a sound output characteristic may be enhanced.

The first sound generation device 1600 and the second sound generation device 1600' may output sound having a middle-high-pitched sound band. Here, a middle-pitched sound band may be sound of about 200 Hz to 3 kHz, and a high-pitched sound band may be sound of about 3 kHz or more. However, embodiments are not limited thereto.

The partition 700 may be formed of polyurethane, polyolefin, and/or the like, but embodiments are not limited thereto. For example, the partition 700 may be formed of a single-sided tape, a double-sided tape, an adhesive, and bond, and/or the like, but embodiments are not limited thereto. For example, the partition 700 may be formed of a material having an elastic force enabling compression to be made to some extent.

Therefore, sounds having the middle-high-pitched sound band may be output by two sound generation devices. Also, when a partition is between two sound generation devices, a left sound and a right sound may be separated from each other, thereby enhancing a stereo characteristic of a sound.

FIG. 14B is a cross-sectional view taken along line of FIG. 14A. With reference to FIG. 14B, the display apparatus may include the first and second sound generation devices 1600 and 1600', the partition 700, and the supporting member 300. The partition 700 may be between the display panel 1000 and the supporting member 300. The supporting member 300 may support one or more of a rear surface and a side surface of the display panel 100. The first and second sound generation devices 1600 and 1600' may be fixed to the supporting member 300. Description given above with reference to the FIG. 10 example may be similarly applied to a process of connecting the first and second sound generation devices 1600 and 1600' to the supporting member 300.

An adhesive member 400 may be in a periphery of each of the display panel 100 and the supporting member 300, and may attach the display panel 100 on the supporting member 300. The adhesive member 400 may include a double-sided tape, a single-side tape, an adhesive, a bond, and/or the like, but embodiments are not limited thereto.

FIG. 14C illustrates another example embodiment of a sound generation device and a partition. With reference to FIG. 14C, a partition 700 for separating a left sound and a right sound generated by a first sound generation device 1600 and a second sound generation device 1600' may be provided. A second partition 700' may be further provided along four outer sides of a display panel 100. The second partition 700' may reduce or prevent sound from being leaked to the outside through each of side surfaces of the display panel 100. Thus, the second partition 700' may allow the sound to be output to only a region in front of the display panel 100, thereby enhancing a sound output characteristic.

If an adhesive member 400 is configured with a foam pad, the adhesive member 400 may act as the second partition 700'. In this case, the second partition 700' may not be provided.

FIGS. 15A to 15K illustrate a sound generation device and a partition in a display apparatus according to another example embodiment of the present disclosure.

As illustrated in FIGS. 15A to 15K, a partition having a double structure including two or more partitions may be provided between a left region and a right region. The left and right regions of a display panel may have the same vibration characteristic when realizing a mono sound in which the left and right regions output the same sound. As such, a resonance phenomenon or an interference phenomenon may be inwrinkled or maximized in a certain frequency band, causing the reduction in sound pressure level. Therefore, the partition may be configured in a structure including two or more partitions, for decreasing an influence of a sound characteristic caused by a resonance frequency difference of a middle-high-pitched sound that may occur in a first sound generation device provided in a first region (e.g., the left region) and a second sound generation device provided in a second region (e.g., the right region). In FIGS. 15A to 15K, the partition having the double structure is illustrated, but three or more partitions may be provided. When three or more partitions are provided, a sound pressure level may be prevented from being reduced even when sound interference in the left and right regions increases, thereby avoiding or preventing a sound output characteristic from being discontinuously recognized.

The first sound generation device and the second sound generation device may output different sounds having the middle-high-pitched sound band, and a stereo sound may be output through left-right sound separation. Alternatively, the first sound generation device may be in the first region, e.g., the left region, the second sound generation device may be in the second region, e.g., the right region, and a sound generation device may not be in a third region, e.g., a center region. Accordingly, a sound characteristic corresponding to the middle-high-pitched sound band in the left region and the right region may be further enhanced.

With reference to FIGS. 15A to 15K, a display panel 100 may display an image, and may include a first region, a second region, and a third region. One or more sound generation devices or a pair of sound generation devices may be in each of the first region and the second region of the display panel 100.

Figure 15A:
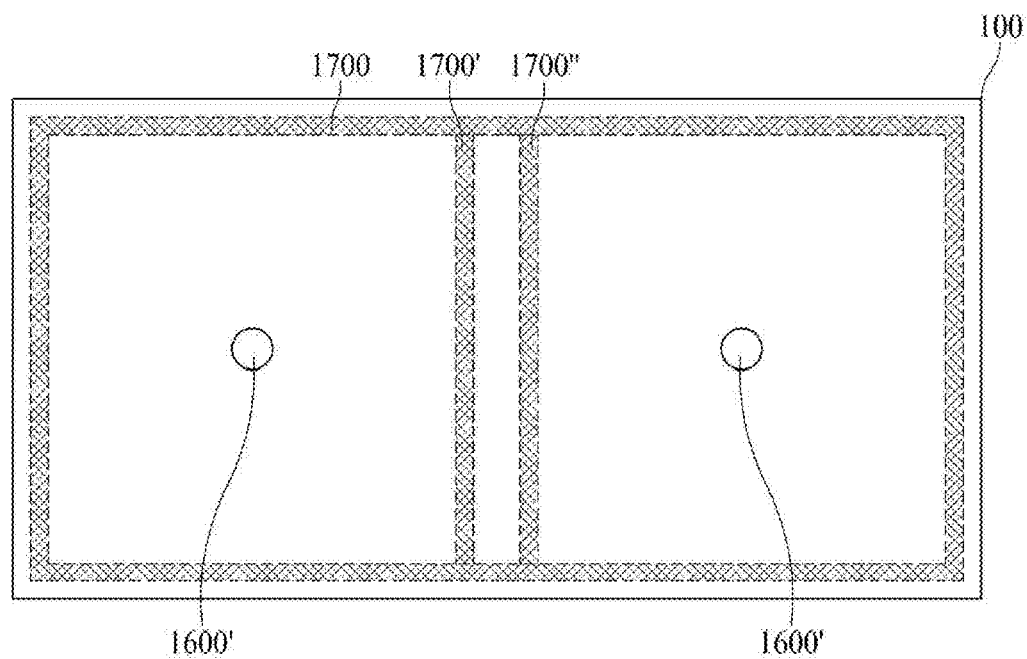
FIGS. 15A to 15K illustrate a sound generation device and a partition in a display apparatus according to another example embodiment of the present disclosure.

With reference to FIG. 15A, a first sound generation device 1600 may be in a first region, which may be a left region of a display panel 100, and a second sound generation device 1600' may be in a second region, which may be a right region of the display panel 100. At least two partitions (for example, a first partition 1700' and a second partition 1700") may be between the first sound generation device 1600 and the second sound generation device 1600'. Alternatively, the first partition 1700' may be configured with two or more sub-partitions between the first sound generation device 1600 and the second sound generation device 1600'. Also, a third partition 1700 may be in a periphery of the display panel 100 or the supporting member. Therefore, at least two partitions may be in a center region of the display panel 100, thereby decreasing an influence of a sound characteristic caused by a resonance frequency difference of a middle-high-pitched sound that may occur in the left region and the right region of the display panel 100.

Figure 15B:
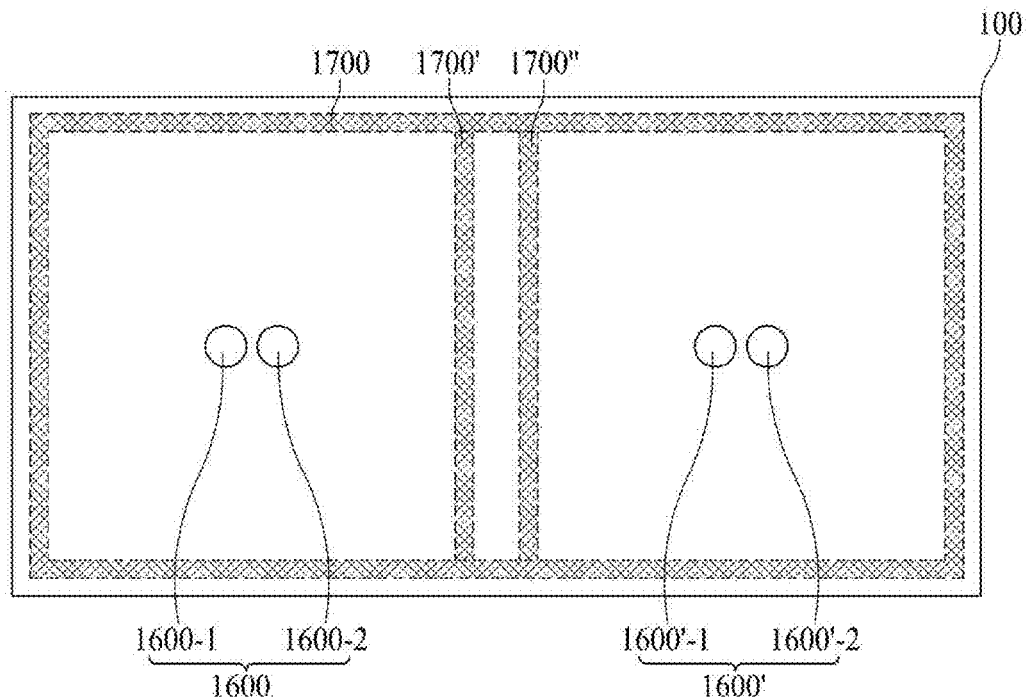

With reference to FIG. 15B, a first sound generation device 1600, including two sound generation device 1600-1 and 1600-2, may be in a first region, which may be a left region of a display panel 100. A second sound generation device 1600', including two sound generation device 1600'-1 and 1600'-2, may be in a second region, which may be a right region of the display panel 100. At least two partitions (for example, a first partition 1700' and a second partition 1700") may be between the first sound generation device 1600 and the second sound generation device 1600'. Alternatively, the first partition 1700' may be configured with two or more sub-partitions between the first sound generation device 1600 and the second sound generation device 1600'. Also, a third partition 1700 may be in a periphery of the display panel 100. Therefore, at least two partitions may be in a center region of the display panel 100, thereby decreasing an influence of a sound characteristic caused by a resonance frequency difference of a middle-high-pitched sound that may occur in the left region and the right region of the display panel 100.

When the first and second sound generation devices 1600 and 1600' each including two sound generation devices are provided, a signal or a current applied to a sound generation device may be divided into two signals or two currents, thereby reducing the occurrence of heat caused by vibration of the sound generation device. Therefore, the occurrence of heat may be reduced, and thus, reliability may be enhanced. Also, when the first and second sound generation devices 1600 and 1600', each including two sound generation devices, are provided, a sound output characteristic may be doubly improved, thereby enhancing a sound pressure level. When the first and second sound generation devices 1600 and 1600' each including two sound generation devices are in at least two of the first region, the second region, and the third region, two sub-sound generation devices, corresponding to each of the first to third regions, may output sounds having the same sound band, thereby increasing a sound pressure level.

Figure 15C:
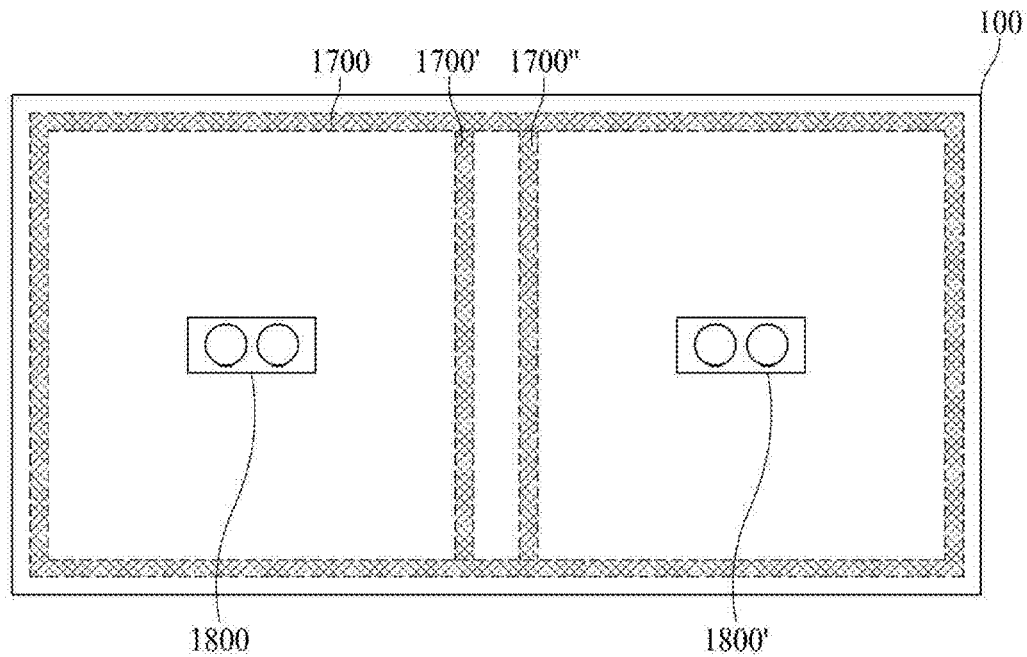

With reference to FIG. 15C, a pair of first sound generation device 1800 may be in a first region, e.g., a left region, of a display panel 100. A pair of second sound generation devices 1800' may be in a second region, e.g., a right region, of the display panel 100. When a pair of sound generation devices is in each of the first region and the second region, delay or interference between sound waves generated by the sound generation devices may be reduced, thereby enhancing a sound output characteristic. At least two partitions (for example, a first partition 1700' and a second partition 1700") may be between the first sound generation device 1800 and the second sound generation device 1800'. Alternatively, the first partition 1700' may be configured with two or more sub-partitions between the first sound generation device 1800 and the second sound generation device 1800'. Also, a third partition 1700 may be in a periphery of the display panel 100 or the supporting member 300. Therefore, at least two partitions may be in a center region of the display panel 100, thereby decreasing an influence of a sound characteristic caused by a resonance frequency difference of a middle-high-pitched sound that may occur in the left region and the right region of the display panel 100.

A sound wave, generated when a display panel vibrates by a vibrating sound generation device, may be spread radially from a center of the sound generation device, and may travel. The sound wave may be referred to as a "progressive wave." The progressive wave may be reflected by one side of a partition to generate a reflected wave, and the reflected wave may travel in a direction opposite to the progressive wave. The reflected wave overlaps and interferes in the progressive wave, and does not travel, thereby generating a standing wave that stands at a certain position. A sound pressure level is reduced by the standing wave, thus, a sound output characteristic is reduced. Therefore, a bent part may be in the partition to decrease the degree of reduction in sound pressure level caused by the standing wave generated by interference between the reflected wave and the progressive wave. Also, the standing wave that causes the sound pressure level to be reduced may be greatly generated at a position at which a level of each of the progressive wave and the reflected wave is high. Accordingly, the bent part may be at a position at which a level of a sound wave transferred from the sound generation device is highest. This will be described below with reference to FIGS. 15D to 15K.

With reference to FIGS. 15D to 15K, a partition having a double structure including two or more partitions may be provided. A bent part may be further provided on at least one side of the partition.

Figure 15D:
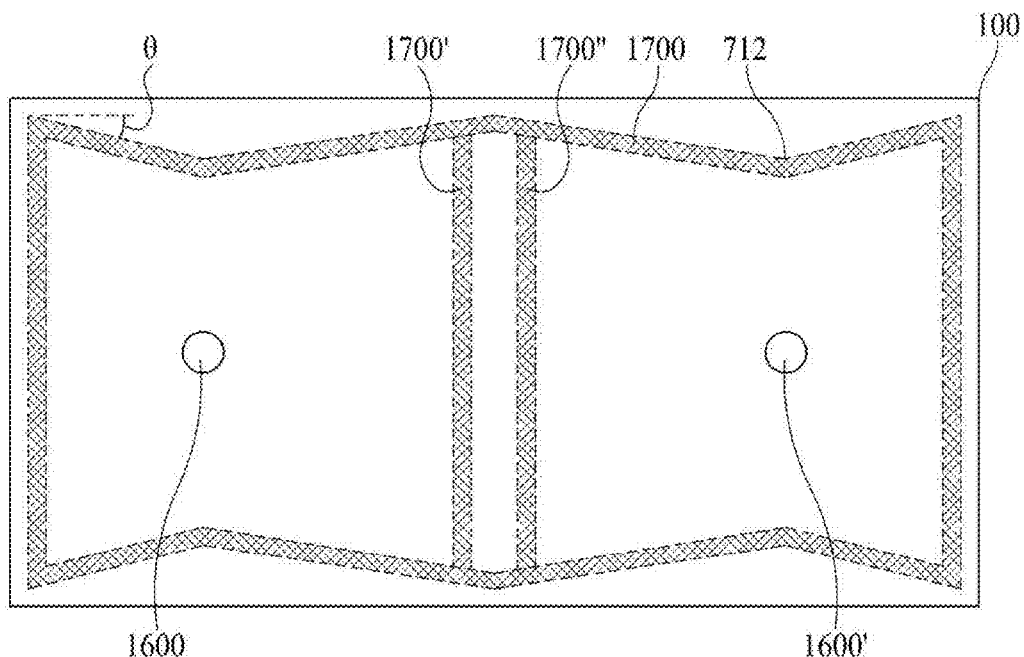
Figure 15E:
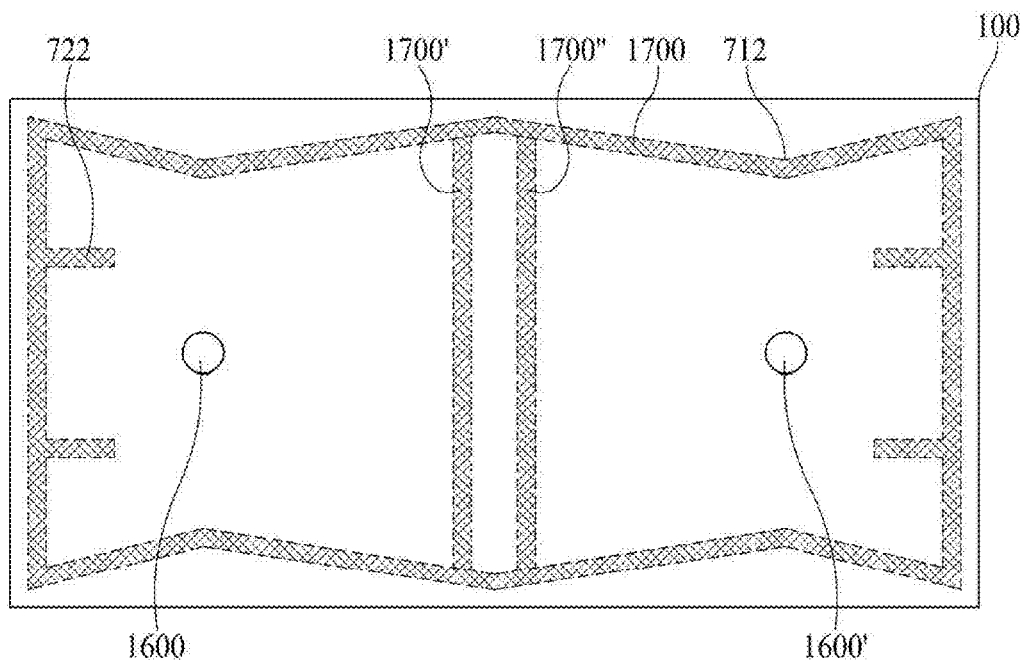

With reference to FIGS. 15D and 15E, a first sound generation device 1600 may be in a first region, e.g., a left region, of a display panel 100, and a second sound generation device 1600' may be disposed in a second region, e.g., a right region, of the display panel 100. At least two partitions (for example, a first partition 1700' and a second partition 1700") may be between the first sound generation device 1600 and the second sound generation device 1600'. Alternatively, the first partition 1700' may be configured with two or more sub-partitions between the first sound generation device 1600 and the second sound generation device 1600'. Also, a third partition 1700 may be in a periphery of the display panel 100 or the supporting member 300. A bent part 712 may be provided on one or more sides of the third partition 1700.

The bent part 712 may be on one or more sides, where a strongest sound wave may reach, of four sides of the first partition 1700, and may extend toward (or face) a direction of the first and second sound generation devices 1600 and 1600'. The bent part 712 may extend toward (or face) a center of each of the first and second sound generation devices 1600 and 1600'. Accordingly, the degree of reduction in a sound pressure level caused by a standing wave may be reduced.

The display panel 100 may include four sides, and the bent part 712 may be on one or more first sides of the four sides. A bent part may be on each of two sides (for example, an upper side and a lower side) of the four sides surrounding the display panel 100 to have a particular inclined angle "θ" with respect to a horizontal direction (or a widthwise direction) of the display panel 100. The bent part 712 may be configured with two rectilinear parts, and may be provided at a position at which the two rectilinear parts contact each other. The bent part 712 may be provided in a rectilinear shape, a straight line shape, a curve shape, a round shape, or the like, but a shape of the bent part 712 is not limited to these examples.

The inclined angle "θ" of the bent part 712 may vary based on a degree to which restriction of the standing wave is desired, and may be variably adjusted to about 10° (degrees) to 30° (degrees). For example, if a sound output region is for the low-pitched sound band or an output of a sound generation device is large, the inclined angle of the bent part 712 may be set to be a large angle. Alternatively, if the sound output region is for the high-pitched sound band or the output of the sound generation device is small, the inclined angle of the bent part 712 may be set to a be small angle. Here, the inclined angle of the bent part 712 may be an angle at which one side of the third partition 1700 is inclined with respect to a horizontal direction (or a widthwise direction) of the display panel 100. Also, the horizontal direction (or the widthwise direction) may correspond to a direction of a long side of a display device, and a vertical direction (or a lengthwise direction) may correspond to a direction of a short side of the display device.

The third partition 1700 may be between the first partition 1700' and the second partition 1700". The third partition 1700 may have a bent shape between the first partition 1700' and the second partition 1700". The bent shape of the third partition 1700 may be provided to face (or bend toward) the display panel 100. The third partition 1700 may have a bent shape, a rectilinear shape, a straight line shape, a curve shape, or a round shape between the first partition 1700' and the second partition 1700", but a shape of the third partition 1700 is not limited to these examples.

With reference to FIG. 15E, the bent part 712 and a protrusion portion 722 may be provided. For example, the bent part 712 may be on one or more sides of the third partition 1700, and one or more protrusion portions 722 may be on a side vertical or perpendicular to a side on which the bent part 712 is provided. A protrusion portion 722 in the left region of the display panel 100 may extend toward (or face) the first sound generation device 1600. A protrusion portion 722 in the right region of the display panel 100 may extend toward (or face) the second sound generation device 1600'.

The protrusion portion 722 may trap a reflected wave, thereby decreasing the degree of reduction in a sound pressure level caused by the standing wave. The protrusion portion 722 may be provided as one or in a plurality on one or more sides of the third partition 1700, and the one or more protrusion portions 722 may be symmetrically disposed with respect to the sound generation device. In the FIG. 15E example, one or more protrusion portions 722 may be on a second side vertical or perpendicular to a first side of four sides of the display panel 100.

Figure 15F:
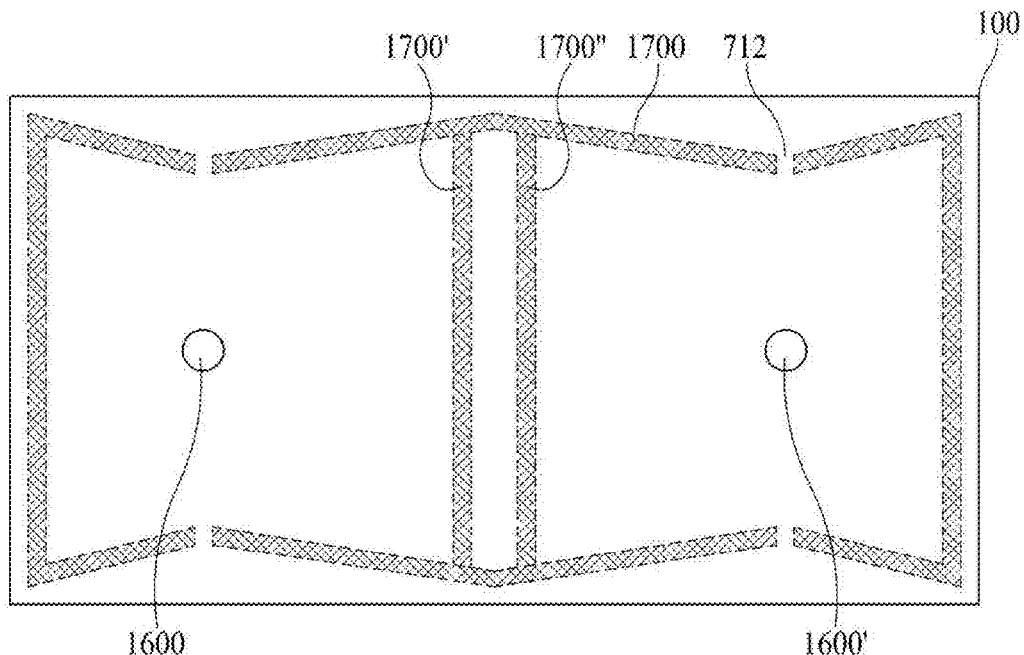
Figure 15G:
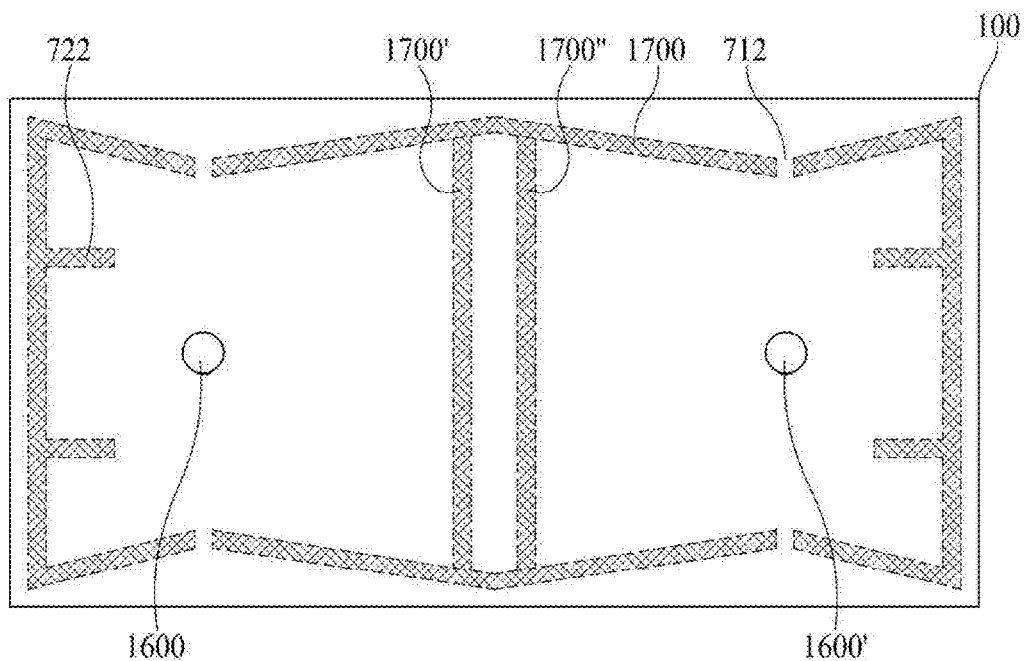

As illustrated in the examples of FIGS. 15D and 15E, the third partition 1700 may have a sealed structure. Also, as illustrated in the examples of FIGS. 15F and 15G, the third partition 1700 may have an unsealed structure. For example, the third partition 1700 may have a zigzag structure and the sealed structure. Alternatively, the third partition 1700 may be provided in the zigzag structure and the unsealed structure. Alternatively, the bent part 712 may have the sealed structure, and a portion of the bent part 712 between the first partition 1700' and the second partition 1700" may have the unsealed structure. If the third partition 1700 is the unsealed structure, the cost of materials of the third partition 1700 may be reduced in comparison with the sealed structure. Also, the inventors have confirmed that a sound characteristic difference does not occur between a case in which the third partition 1700 is the unsealed structure and a case in which the third partition 1700 is the sealed structure.

With reference to FIGS. 15F and 15G, a first sound generation device 1600 may be in a first region, e.g., a left region of a display panel 100, and a second sound generation device 1600' may be in a second region, e.g., a right region, of the display panel 100. A first partition 1700' and a second partition 1700" may be between the first sound generation device 1600 and the second sound generation device 1600', and a third partition 1700 may be in a periphery of the display panel 100. The first partition 1700' may be configured with two or more sub-partitions between the first sound generation device 1600 and the second sound generation device 1600'. A bent part 712 may be on one or more sides of the third partition 1700. The bent part 712 may bend toward a central direction of the first sound generation device 1600 and a central direction of the second sound generation device 1600'. The third partition 1700 may have the unsealed structure. For example, the third partition 1700 may have the zigzag structure and the unsealed structure. Alternatively, the third partition 1700 may have the unsealed structure, and a portion of the bent part 712 between the first partition 1700' and the second partition 1700" may have the sealed structure.

In FIG. 15G, an example in which a protrusion portion 722 is further provided is illustrated. A description of the protrusion portion 722 is substantially similar to the description given above with reference to FIG. 15E, and is not repeated.

Figure 15H:
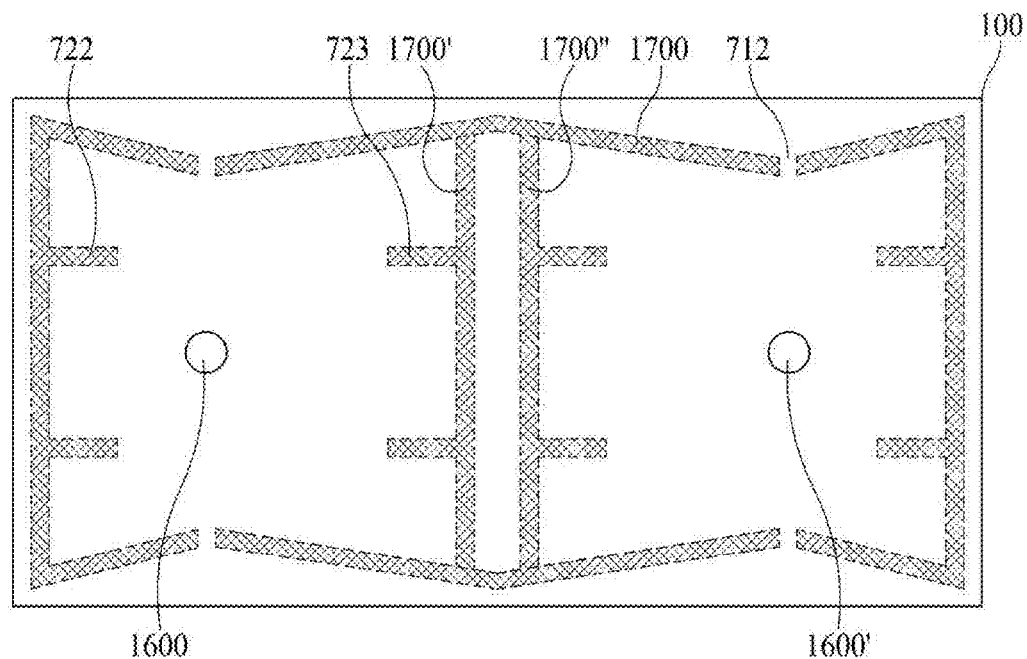
Figure 15I:
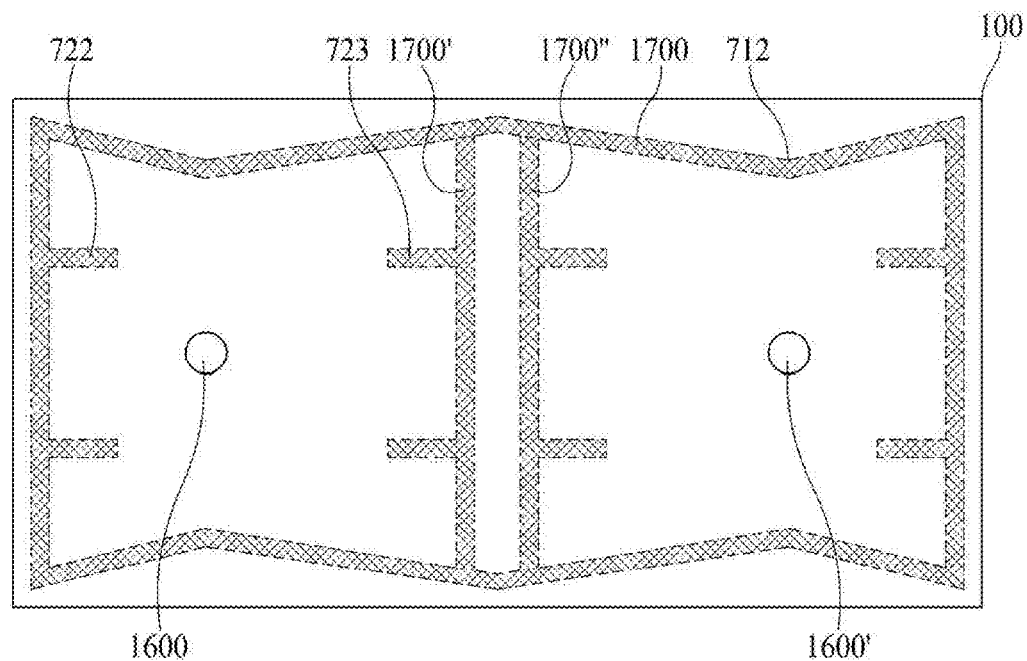

In the examples of FIGS. 15H and 15I, each of a protrusion portion 722 and a second protrusion portion 723 may be provided as one or in a plurality on a second side vertical to a first side of four sides of the display panel 100. A protrusion portion 722 and a second protrusion portion 723, in a left region of a display panel 100, may extend toward (or face) a first sound generation device 1600. A protrusion portion 722 and a second protrusion portion 723, in a right region of the display panel 100, may extend toward (or face) a second sound generation device 1600'. Therefore, when the protrusion portion 722 and the second protrusion portion 723 are provided, the protrusion portion 722 and the second protrusion portion 723 may trap a reflected wave, thereby decreasing the degree of reduction in a sound pressure level caused by the standing wave.

As illustrated in the FIG. 15H example, a third partition 1700 may have the sealed structure. As illustrated in the FIG.

15I example, the third partition 1700 may have the unsealed structure. A description of the third partition 1700 is substantially similar to the description given above with reference to FIGS. 15D to 15G, and is not repeated.

Figure 15J:
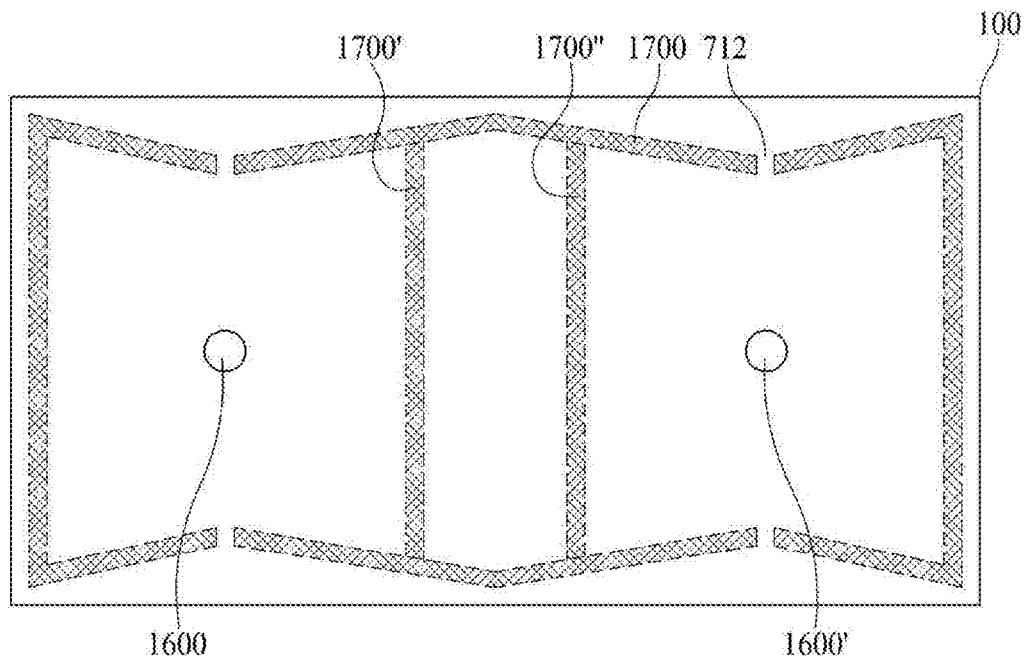
Figure 15K:
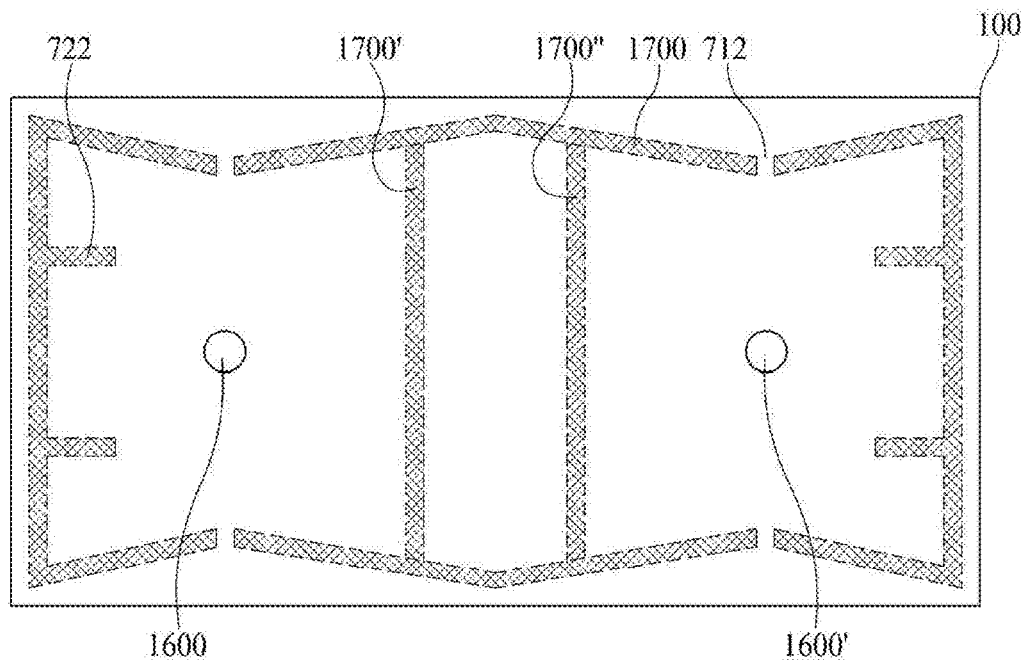

In FIGS. 15J and 15K, an interval or space between a first partition 1700' and a second partition 1700" may be set to be greater than an interval or space in FIGS. 15A to 15I. For example, a sound characteristic corresponding to the low-pitched sound band may be more enhanced than a case in which an area of a first region, an area of a second region, and an area of a third region are the same.

In FIG. 15K, an example in which a protrusion portion 722 is further provided is illustrated. A description of the protrusion portion 722 is substantially similar to the description given above with reference to FIG. 15E, and is not repeated. A structure of each of the sound generation device and the partition illustrated in FIGS. 15C to 15H may be similarly applied to the embodiment of FIGS. 15I and 15J.

In FIGS. 15D to 15K, examples in which one sound generation device is in each of the first region and the second region of the display panel 100 is illustrated, but embodiments are not limited thereto. For example, a pair of sound generation devices may be in each of the first region and the second region of the display panel 100, as illustrated in FIG. 15C. Also, in FIGS. 15D to 15K, a sound generation device including two sound generation devices may be in each of the first region and the second region of the display panel 100, as illustrated in FIG. 15B.

In FIGS. 15A to 15K, the display panel 100 may include three regions, and a sound generation device may not be in the third region, e.g., a center region, of the display panel 100. An area of the third region may be set to be less than that of each of the first and second regions. In this case, sound quality corresponding to the low-pitched sound band may be enhanced. Also, an area of the first region, an area of the second region, and an area of the third region may be equally set for a sound output characteristic corresponding to the middle-high-pitched sound band to be almost similar to a sound output characteristic corresponding to the low-pitched sound band. Also, to enhance a sound output characteristic corresponding to the low-pitched sound band, an area of the third region may be set greater than that of each of the first and second regions.

In FIGS. 15J and 15K, the third partition 1700 may have the unsealed structure, Alternatively, the third partition 1700 may have the sealed structure.

FIGS. 15D to 15I illustrate examples in which a sound generation device is not in a center of the left region, which may be the first region of the display panel 100, or a center of the right region, which may be the second region. Rather, in those examples, the sound generation device may be close to the left region or the right region. However, embodiments are not limited thereto. For example, the sound generation device may be in the center of the left region, which may be the first region of the display panel 100, or the center of the right region, which may be the second region. Alternatively, the sound generation device may be asymmetrically disposed in the first region and the second region of the display panel 100. A stereo sound characteristic is more enhanced when the sound generation device is close to the left region or the right region, as compared to a case in which the sound generation device is in the center of the left region, which may be the first region of the display panel 100, or the center of the right region, which may be the second region. In FIGS. 15A to 15K, an adhesive member for attaching a display panel to a supporting member may be provided in a periphery of each of the display panel and the supporting member, as illustrated in the examples of FIGS. 14A to 14C.

A sound output characteristic corresponding to a case in which a bent part is provided will be described below with reference to FIG. 16. Also, a sound output characteristic corresponding to a case in which a bent part and a protrusion portion are provided will be described below with reference to FIG. 17.

Figure 16:
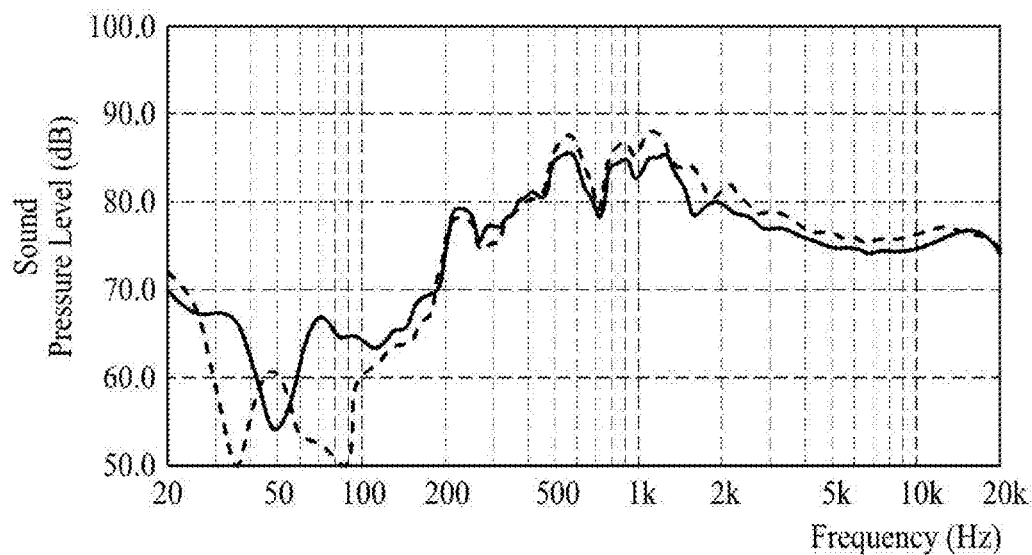
FIG. 16 illustrates a sound output characteristic according to another example embodiment of a sound generation device and a partition in a display apparatus according to an example embodiment of the present disclosure.

FIG. 16 illustrates a sound output characteristic according to another example embodiment of a sound generation device and a partition in a display apparatus according to an example embodiment of the present disclosure.

In FIG. 16, a dotted line shows a sound output characteristic of FIG. 15A, and a solid line shows a sound output characteristic of FIG. 15D. With reference to FIG. 16, it can be seen that in a frequency of about 200 Hz corresponding to the low-pitched sound band, a sound output characteristic is better when a bent part is provided, as compared to when the bent part is not provided.

Figure 17:
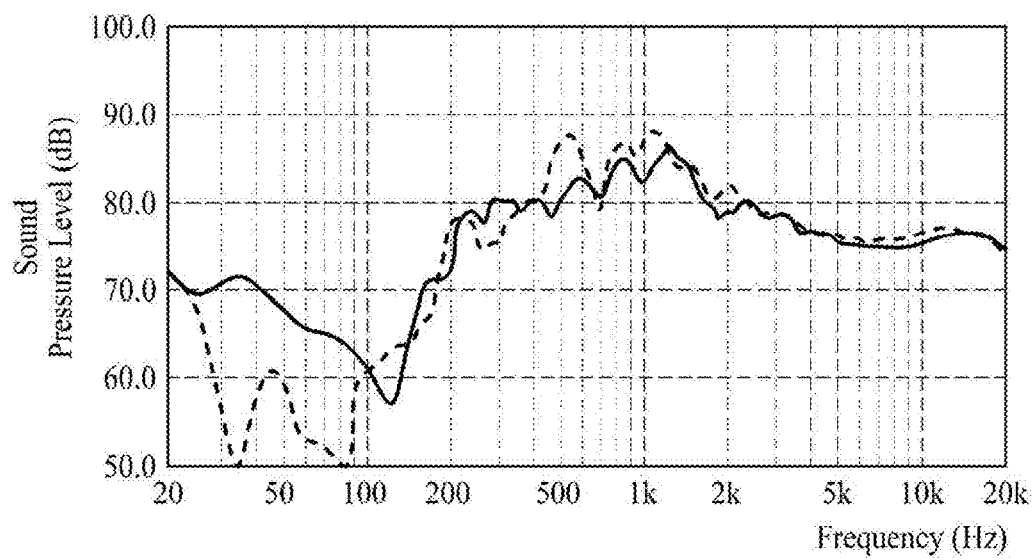
FIG. 17 illustrates a sound output characteristic according to another example embodiment of a sound generation device and a partition in a display apparatus according to an example embodiment of the present disclosure.

FIG. 17 illustrates a sound output characteristic according to another example embodiment of a sound generation device and a partition in a display apparatus according to an example embodiment of the present disclosure.

In FIG. 17, a dotted line shows a sound output characteristic of FIG. 15A, and a solid line shows a sound output characteristic of FIG. 15E. With reference to FIG. 17, it can be seen that a frequency characteristic corresponding to a whole sound band is better when a bent part and a protrusion portion are provided, as compared to when the bent part and the protrusion portion are not provided.

The sound output characteristic of each of the examples of FIGS. 16 and 17 may be measured by a sound analysis apparatus. The sound analysis apparatus may include a sound card that may transmit or receive a sound to or from a control PC, an amplifier that may amplify a signal generated from the sound card and may transfer the amplified signal to sound generation devices 1600 and 1600', and a microphone that may collect a sound generated by the sound generation devices 1600 and 1600' in a display panel. The sound collected through the microphone may be input to the control PC through the sound card, and a control program may check the input sound to analyze the sound of the sound generation devices 1600 and 1600'.

FIGS. 18A to 18F illustrate another example embodiment of a sound generation device and a partition in a display apparatus according to an example embodiment of the present disclosure.

FIGS. 18A to 18F illustrate examples in which one or more sound generation devices or a pair of sound generation devices are in each of a first region and a second region of a display panel. In FIGS. 18A to 18F, a third partition 1700 may have the sealed structure. For example, the third partition 1700 may have the zigzag structure and the sealed structure. Alternatively, a bent part 712 may have the sealed structure, and a portion of the bent part 712 between a first partition 1700' and a second partition 1700" may have the unsealed structure. The portion of the bent part 712 between the first partition 1700' and the second partition 1700" may have a rectilinear shape, a straight line shape, a curve shape, or a round shape, but the shape is not limited to these examples.

Figure 18A:
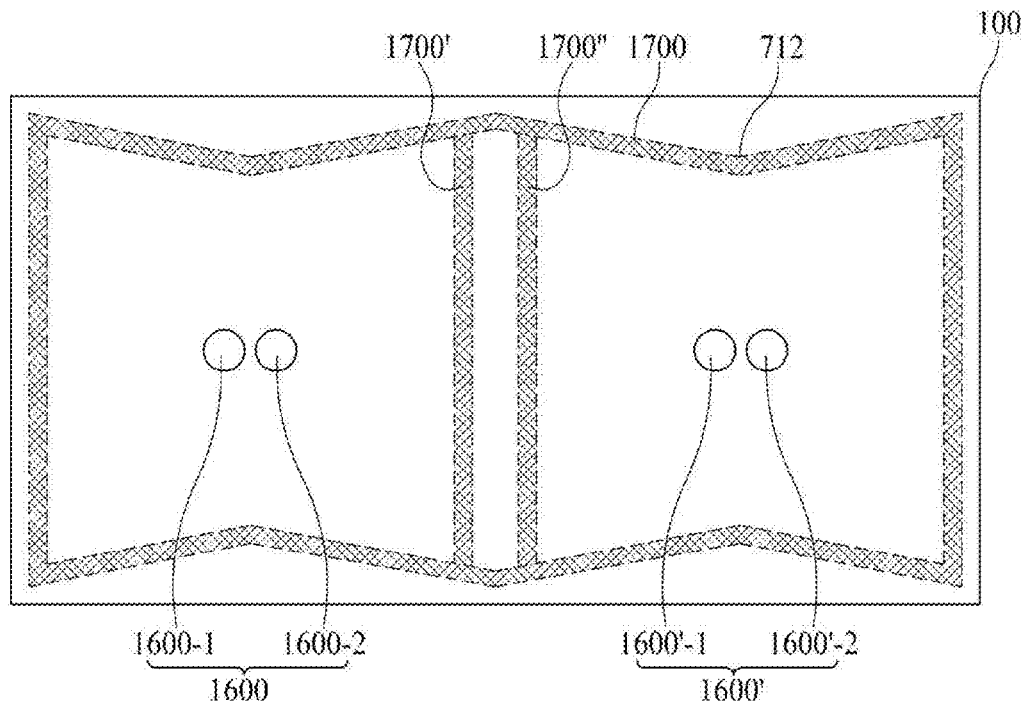
FIGS. 18A to 18F illustrate another example embodiment of a sound generation device and a partition in a display apparatus according to an example embodiment of the present disclosure.
Figure 18B:
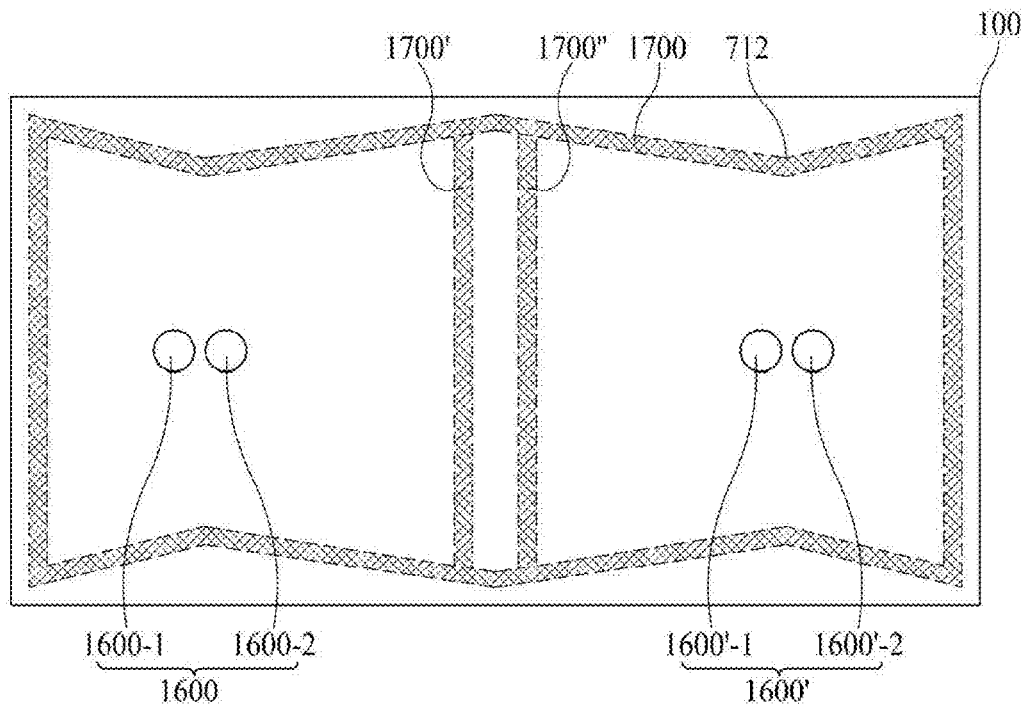
Figure 18C:
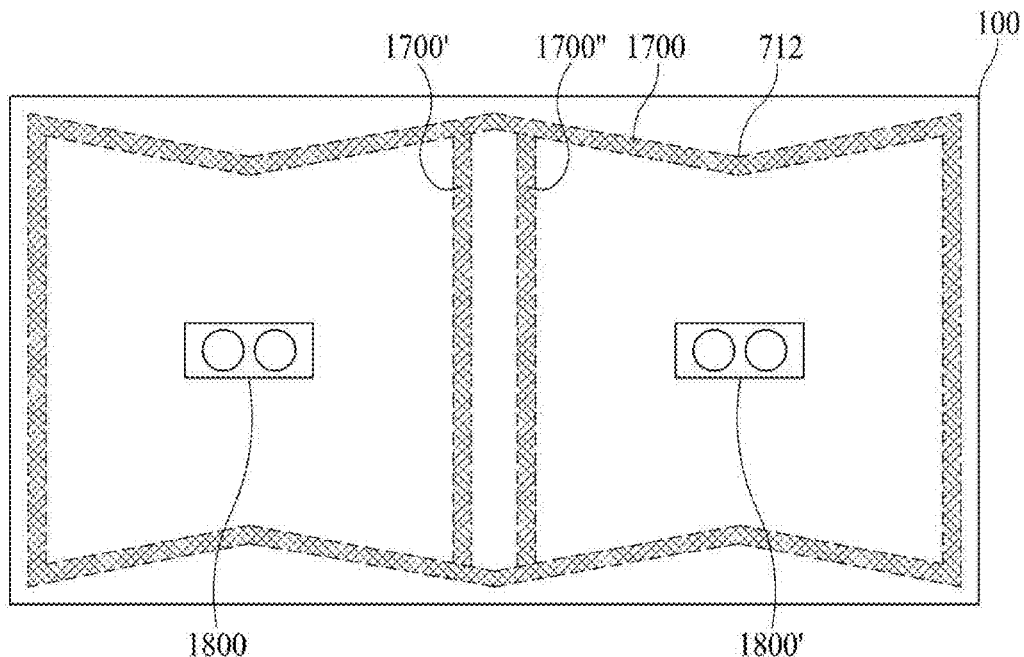
Figure 18D:
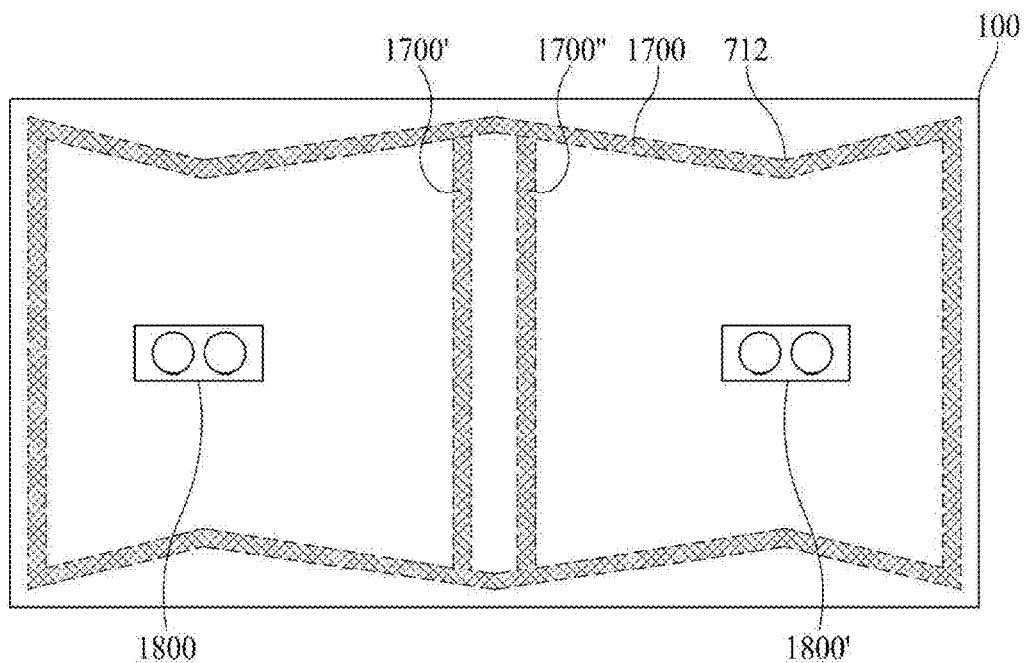
Figure 18E:
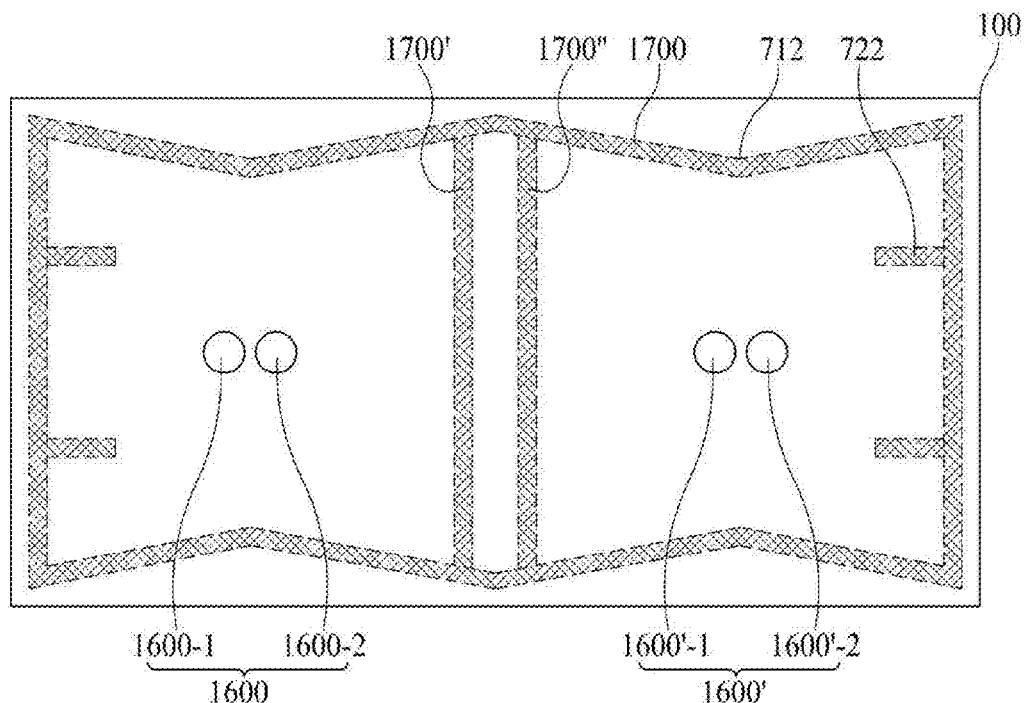
Figure 18F:
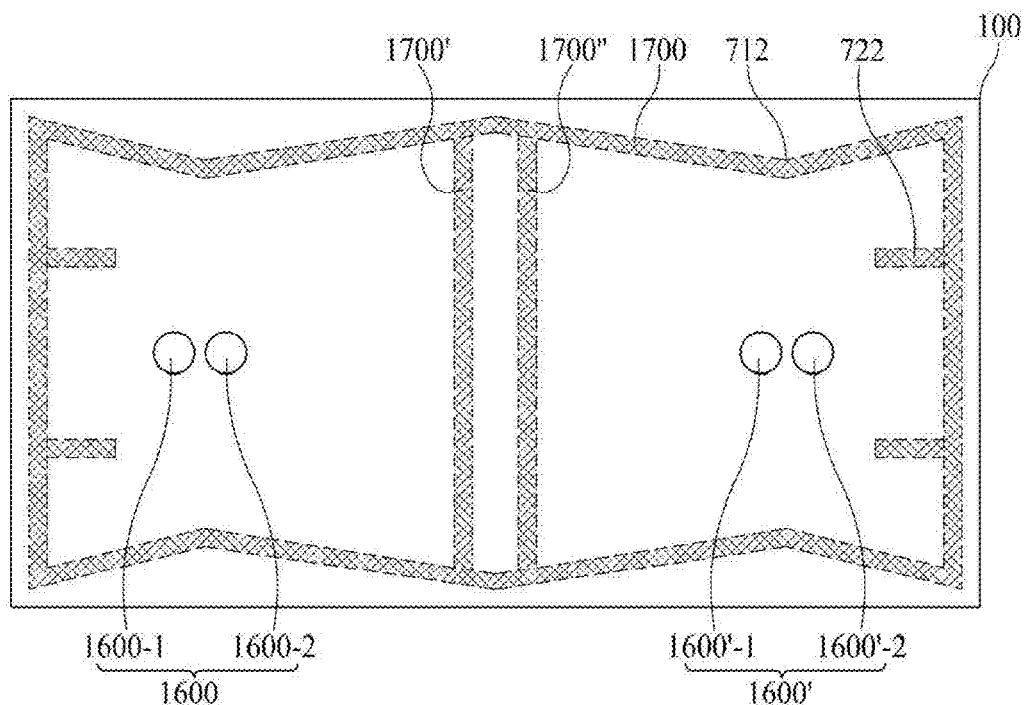

FIGS. 18A, 18C, and 18E illustrate examples in which a sound generation device is in a center of a left region, which may be a first region of a display panel 100, or a center of a right region, which may be a second region. In FIGS. 18B, 18D, and 18F, examples in which the sound generation device is asymmetrically disposed are illustrated. For example, FIGS. 18B, 18D, and 18F illustrate examples in which the sound generation device is close to the left region, which may be the first region of the display panel 100, or the right region, which may be the second region.

With reference to FIGS. 18A and 18B, a first sound generation device 1600, including two sound generation devices 1600-1 and 1600-2, may be in a first region, which may be a left region of a display panel 100, and a second sound generation device 1600', including two sound generation devices 1600'-1 and 1600'-2, may be in a second region, which may be a right region of the display panel 100. A first partition 1700' and a second partition 1700" may be between the first sound generation device 1600 and the second sound generation device 1600', and a third partition 1700 may be in a periphery of the display panel 100. Alternatively, the first partition 1700' may include two or more sub-partitions between the first sound generation device 1600 and the second sound generation device 1600'. A bent part 712 may be on one or more sides of the third partition 1700, and may bend in a direction toward a center of the two sound generation devices 1600-1 and 1600-2 of the first sound generation device 1600, and in a direction toward a center of the two sound generation devices 1600'-1 and 1600'-2 of the second sound generation device 1600'.

With reference to FIGS. 18C and 18D, a pair of first sound generation devices 1800 may be in a first region, which may be a left region of a display panel 100, and a pair of second sound generation devices 1800' may be in a second region, which may be a right region of the display panel 100. A first partition 1700' and a second partition 1700" may be between the first sound generation device 1800 and the second sound generation device 1800', and a third partition 1700 may be disposed in a periphery of the display panel 100. Alternatively, the first partition 1700' may include two or more sub-partitions between the first sound generation device 1800 and the second sound generation device 1800'. A bent part 712 may be on one or more sides of the third partition 1700. For example, the bent part 712 may be bent in a direction toward a center of the pair of first sound generation devices 1800, and in a direction toward a center of the pair of second sound generation devices 1800'.

In FIGS. 18C and 18D, one or more protrusion portions may be further provided on a side vertical or perpendicular to a side on which the bent part 712 is provided, as illustrated in the examples of FIGS. 15G, 15H, 15I, and 15K. Alternatively, one or more protrusion portions may be further provided on a side of the third partition 1700. Also, as in the examples of FIGS. 15H and 15I, one or more protrusion portions may be further provided on each side vertical (or perpendicular) to the side on which the bent part 712 is provided. Alternatively, one or more protrusion portions may be further provided on a side of each of the first partition 1700', the second partition 1700", and the third partition 1700.

With reference to FIGS. 18E and 18F, a first sound generation device 1600, including two sound generation devices 1600-1 and 1600-2, may be in a first region, which may be a left region of a display panel 100. A second sound generation device 1600', including two sound generation devices 1600'-1 and 1600'-2, may be in a second region, which may be a right region of the display panel 100.

When the first and second sound generation devices 1600 and 1600', each including two sound generation devices, are provided, a signal or a current applied to a sound generation device may be divided into two signals or two currents, thereby reducing the occurrence of heat caused by a vibration of the sound generation device. Therefore, the occurrence of heat may be reduced, and thus, reliability may be enhanced. When the first and second sound generation devices 1600 and 1600', each including two sound generation devices, are provided, a sound output characteristic may be doubly improved, thereby enhancing a sound pressure level. When the first and second sound generation devices 1600 and 1600', each including two sound generation devices, are in at least two of the first region, the second region, and the third region, two sub-sound generation devices corresponding to each of the first to third regions may output sounds having the same sound band, thereby increasing a sound pressure level.

Moreover, one or more protrusion portions 722 may be further provided on each side vertical (or perpendicular) to the side on which the bent part 712 is provided. Alternatively, one or more protrusion portions may be further provided on a side of each of the first partition 1700', the second partition 1700", and the third partition 1700.

In the examples of FIGS. 18E and 18F, a second protrusion portion described above with reference to 15H and 15I may be further provided. Each of a protrusion portion and a second protrusion portion may be provided as one or as a plurality on a second side vertical to a first side of four sides of the display panel 100. A protrusion portion may be in the left region of the display panel 100, and the protrusion portion and a second protrusion portion may face the first sound generation device 1600. A protrusion portion may be in the right region of the display panel 100, and the protrusion portion and a second protrusion portion may be face the second sound generation device 1600'.

The first sound generation device 1600 and the second sound generation device 1600' may output different sounds having the middle-high-pitched sound band, and a stereo sound may be output through left-right sound separation. Alternatively, the first sound generation device 1600 may be in the first region, which may be the left region, the second sound generation device 1600' may be in the second region, which may be the right region, and a sound generation device may not be in a third region, which may be a center region. Accordingly, a sound characteristic corresponding to the middle-high-pitched sound band in the left region and the right region may be more enhanced. In the examples of FIGS. 18A to 18F, an adhesive member for attaching a display panel to a supporting member may be in a periphery of each of the display panel and the supporting member, as in the FIG. 14 example.

FIGS. 19A to 19F illustrate another example embodiment of a sound generation device and a partition in a display apparatus according to an example embodiment of the present disclosure.

In the examples of FIGS. 19A to 19F, one or more sound generation devices or a pair of sound generation devices are in each of a first region and a second region of a display panel. In the examples of FIGS. 19A to 19F, a third partition 1700 may have the unsealed structure. For example, the third partition 1700 may have the zigzag structure and the unsealed structure. Alternatively, a bent part 712 may have the unsealed structure, and a portion of the bent part 712 between a first partition 1700' and a second partition 1700" may have the sealed structure. The portion of the bent part 712 between the first partition 1700' and the second partition 1700" may have a rectilinear shape, a straight line shape, a curve shape, or a round shape, but embodiments are not limited thereto.

Figure 19A:
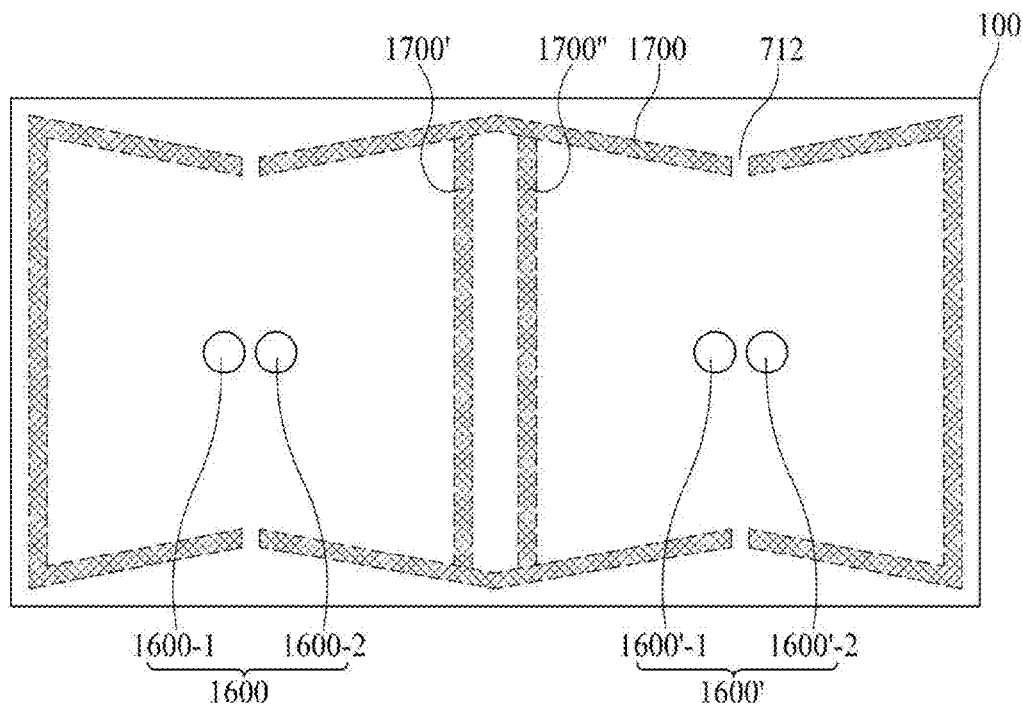
FIGS. 19A to 19F illustrate another example embodiment of a sound generation device and a partition in a display apparatus according to an example embodiment of the present disclosure.
Figure 19B:
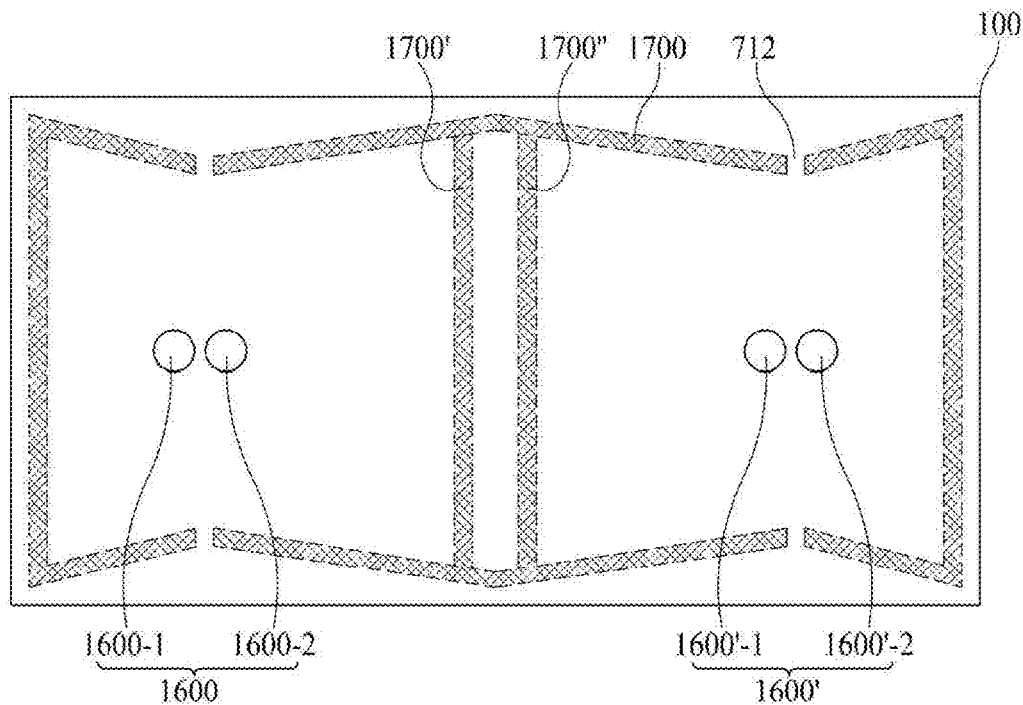
Figure 19C:
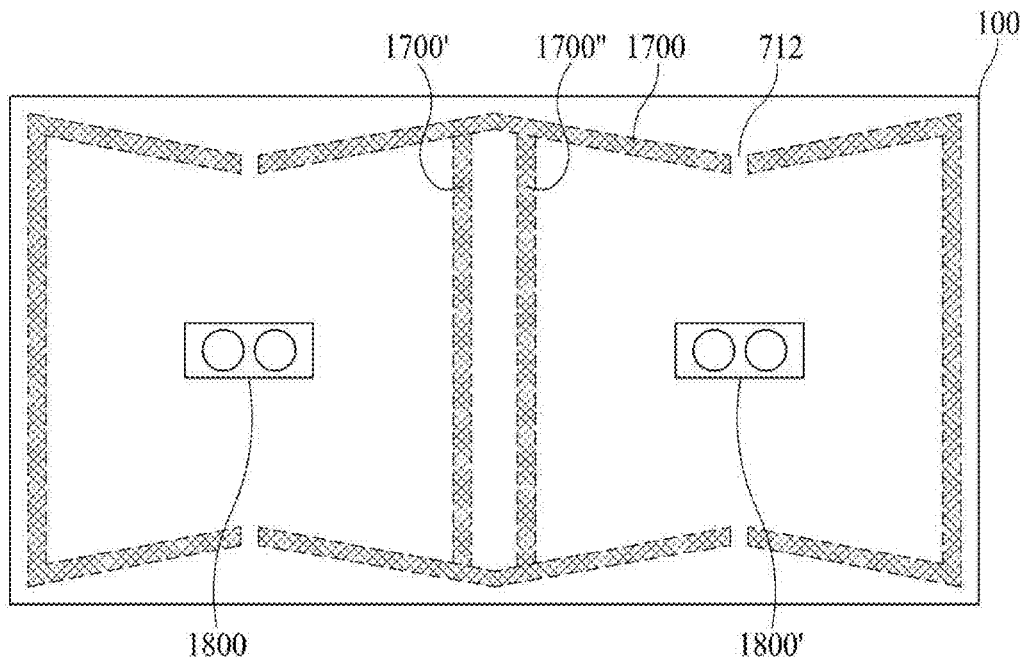
Figure 19D:
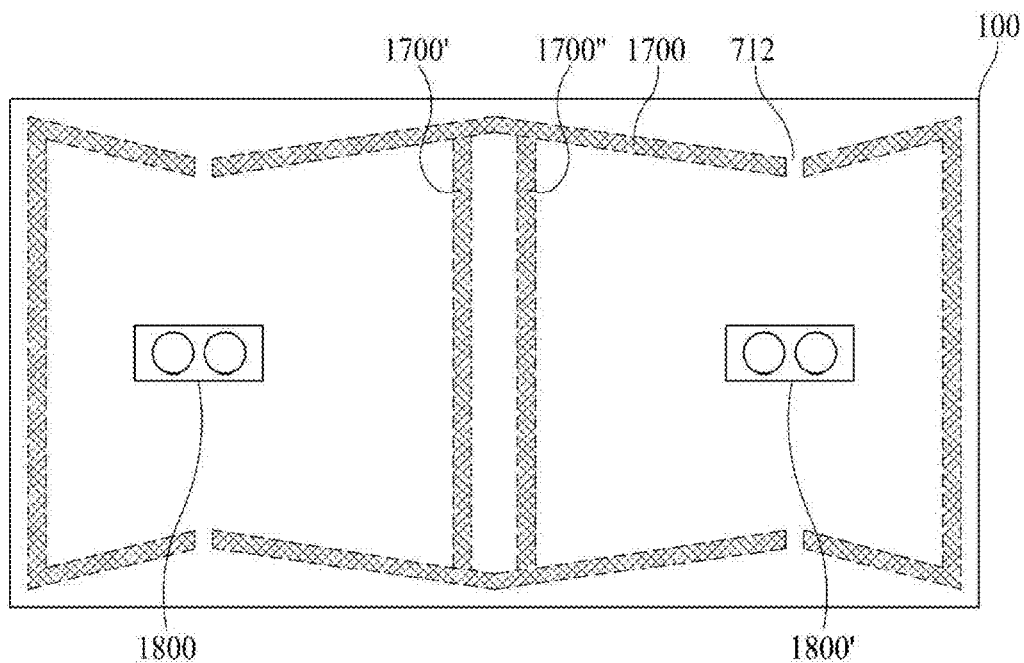
Figure 19E:
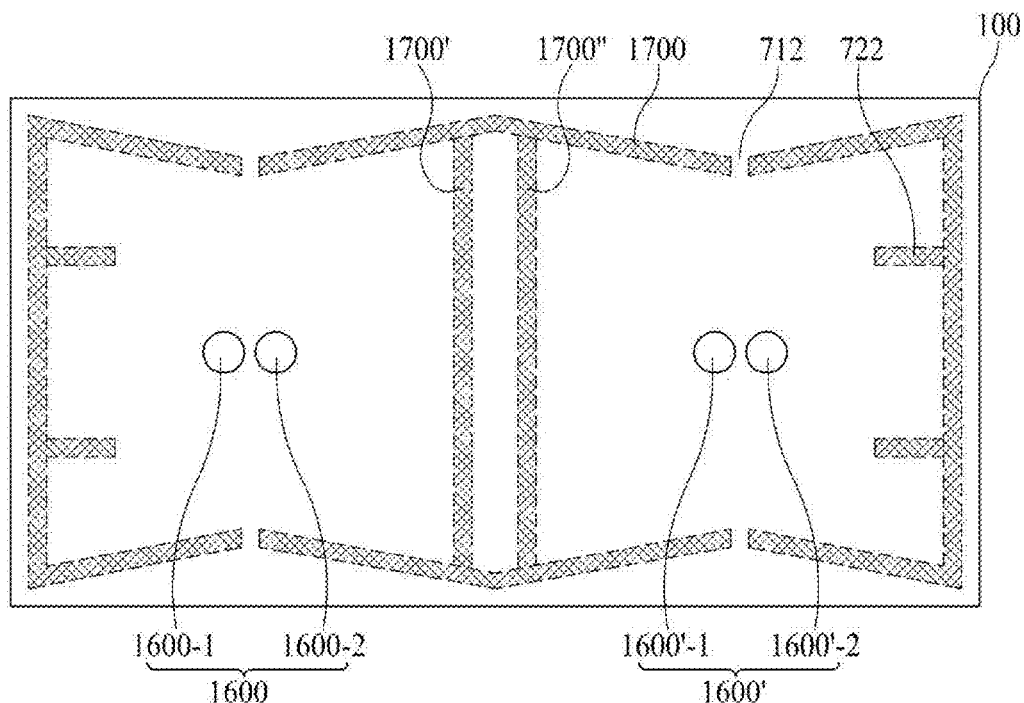
Figure 19F:
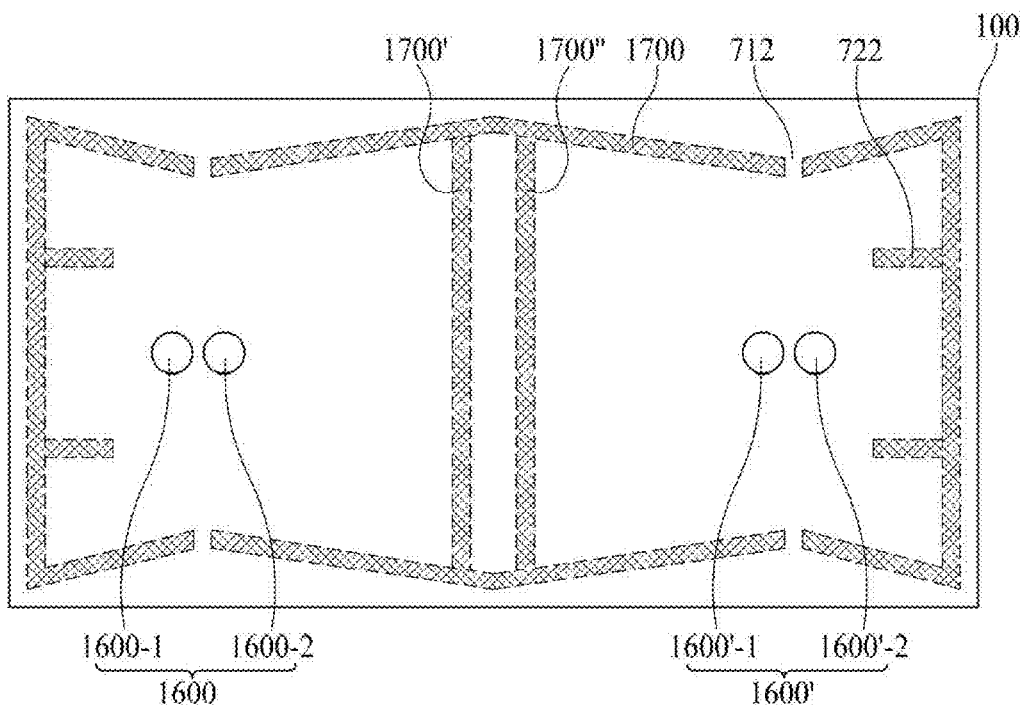

FIGS. 19A, 19C, and 19E are diagrams illustrating examples in which a sound generation device is in a center of a left region, which may be a first region of a display panel 100, or a center of a right region, which may be a second region. In FIGS. 19B, 19D, and 19F, examples in which the sound generation device is asymmetrically disposed are illustrated. For example, FIGS. 19B, 19D, and 19F are diagrams illustrating examples in which the sound generation device is close to the left region, which may be the first region of the display panel 100, or the right region, which may be the second region.

With reference to FIGS. 19A and 19B, a first sound generation device 1600, including two sound generation devices 1600-1 and 1600-2, may be in a first region, which may be a left region of a display panel 100. A second sound generation device 1600', including two sound generation devices 1600'-1 and 1600'-2, may be in a second region, which may be a right region of the display panel 100. A first partition 1700' and a second partition 1700" may be between the first sound generation device 1600 and the second sound generation device 1600', and a third partition 1700 may be in a periphery of the display panel 100. Alternatively, the first partition 1700' may include two or more sub-partitions between the first sound generation device 1600 and the second sound generation device 1600'. A bent part 712 may be on one or more sides of the third partition 1700, and may bend in a direction toward a center of the two sound generation devices 1600-1 and 1600-2 of the first sound generation device 1600, and in a direction toward a center of the two sound generation devices 1600'-1 and 1600'-2 of the second sound generation device 1600'.

With reference to the examples of FIGS. 19C and 19D, a pair of first sound generation devices 1800 may be in a first region, which may be a left region of a display panel 100, and a pair of second sound generation devices 1800' may be in a second region, which may be a right region of the display panel 100. A first partition 1700' and a second partition 1700" may be between the first sound generation device 1800 and the second sound generation device 1800', and a third partition 1700 may be in a periphery of the display panel 100. Alternatively, the first partition 1700' may include two or more sub-partitions between the first sound generation device 1800 and the second sound generation device 1800'. A bent part 712 may be on one or more sides of the third partition 1700. For example, the bent part 712 may bend in a direction toward a center of the pair of first sound generation devices 1800, and in a direction toward a center of the pair of second sound generation devices 1800'.

In FIGS. 19C and 19D, one or more protrusions may be further provided on a side vertical (or perpendicular) to a side on which the bent part 712 is provided, as in the examples of FIGS. 15G, 15H, 15I, and 15K. Alternatively, one or more protrusions may be further provided on a side of the third partition 1700. Also, as in the examples of FIGS. 15H and 15I, one or more protrusions may be further provided on each side vertical (or perpendicular) to the side on which the bent part 712 is provided. Alternatively, one or more protrusion portions may be further provided on a side of each of the first partition 1700', the second partition 1700", and the third partition 1700.

With reference to FIGS. 19E and 19F, a first sound generation device 1600, including two sound generation device 1600-1 and 1600-2, may be in a first region, which may be a left region of a display panel 100. A second sound generation device 1600', including two sound generation device 1600'-1 and 1600'-2, may be in a second region, which may be a right region of the display panel 100.

Moreover, when the first and second sound generation devices 1600 and 1600', each including two sound generation devices, are provided, a signal or a current applied to a sound generation device may be divided into two signals or two currents, thereby reducing the occurrence of heat caused by a vibration of the sound generation device. Therefore, the occurrence of heat may be reduced, and thus, reliability may be enhanced. Also, when the first and second sound generation devices 1600 and 1600', each including two sound generation devices, are provided, a sound output characteristic may be doubly improved, thereby enhancing a sound pressure level. Also, when the first and second sound generation devices 1600 and 1600', each including two sound generation devices, are in at least two of the first region, the second region, and the third region, two sub-sound generation devices, corresponding to each of the first to third regions, may output sounds having the same sound band, thereby increasing a sound pressure level.

Moreover, one or more protrusion portions 722 may be further provided on each side vertical (or perpendicular) to the side on which the bent part 712 is provided. Alternatively, one or more protrusion portions may be further provided on a side of each of the first partition 1700', the second partition 1700", and the third partition 1700.

In the examples of FIGS. 19E and 19F, a second protrusion portion, e.g., the second protrusion portion 723 described above with reference to the examples of FIGS. 15H and 15I, may be further provided. Each of a protrusion portion 722 and a second protrusion portion 723 may be provided as one or as a plurality on a second side vertical to a first side of four sides of the display panel 100. A protrusion portion 722 may be in the left region of the display panel 100, and the protrusion portion 722 and a second protrusion portion 723 may face the first sound generation device 1600. A protrusion portion 722 may be in the right region of the display panel 100, and the protrusion portion 722 and a second protrusion portion 723 may face the second sound generation device 1600'.

The first sound generation device 1600 and the second sound generation device 1600' may output different sounds having the middle-high-pitched sound band, and a stereo sound may be output through left-right sound separation. Alternatively, the first sound generation device 1600 may be in the first region, which may be the left region, the second sound generation device 1600' may be in the second region, which may be the right region, and a sound generation device may not be provided in a third region, which may be a center region. Accordingly, a sound characteristic corresponding to the middle-high-pitched sound band in the left region and the right region may be more enhanced.

In FIGS. 19A to 19F, an adhesive member for attaching a display panel to a supporting member may be in a periphery of each of the display panel and the supporting member as in FIG. 14. Descriptions given above with reference to FIGS. 8A to 13 may be applied substantially similar to embodiments of the sound generation device and the partition described with reference to FIGS. 14A to 14C, 15A to 15K, 18A to 18F, and 19A to 19F.

A display apparatus according to an embodiment of the present disclosure will be described below.

According to an embodiment of the present disclosure, a display apparatus may include: a display panel configured to display an image, a supporting member on a rear surface of the display panel, at least one sound generation device adjacent to the display panel, a wiring configured to transfer a signal to the at least one sound generation device, and a supporting plate on the rear surface of the display panel, the supporting plate being under the at least one sound generation device and the wiring.

For example, in the display apparatus according to an embodiment of the present disclosure, the at least one sound generation device may include: a plate including an extension part, a magnet and a center pole on the plate, a bobbin near the center pole, a coil around the bobbin, and a terminal in the extension part, the terminal being connected to the wiring. For example, in the display apparatus according to an embodiment of the present disclosure, the supporting plate may include at least one hole, and a portion of the wiring may extend to a rear surface of the supporting member through the at least one hole.

For example, the display apparatus according to an embodiment of the present disclosure may further include a rear cover on the rear surface of the supporting member, and the extended portion of the wiring may be under the rear cover. For example, the display apparatus according to an embodiment of the present disclosure may further include a rear cover on the rear surface of the supporting member, and the supporting plate and the extended portion of the wiring may be under the rear cover.

For example, the display apparatus according to an embodiment of the present disclosure may further include a pad between the at least one sound generation device and the supporting plate. For example, in the display apparatus according to an embodiment of the present disclosure, the at least one sound generation device may include one of: one sound generation device, two sound generation devices, and a pair of sound generation devices.

According to an embodiment of the present disclosure, a display apparatus may include: a display panel configured to display an image, at least one supporting member on a rear surface of the display panel, at least one sound generation device adjacent to the display panel, a wiring configured to transfer a signal to the at least one sound generation device, and a supporting plate on a rear surface of the at least one supporting member, the supporting plate including at least one hole through which the wiring may extend to the rear surface of the at least one supporting member.

For example, in the display apparatus according to an embodiment of the present disclosure, the at least one sound generation device and the wiring may be covered by the supporting plate. For example, in the display apparatus according to an embodiment of the present disclosure, the at least one sound generation device may include: a magnet and a center pole on a plate, an extension part extending from the plate, a bobbin near the center pole, a coil around the bobbin, and a terminal in the extension part, the terminal being connected to the wiring.

For example, in the display apparatus according to an embodiment of the present disclosure, the at least one supporting member may include: a first supporting member, and a second supporting member on the first supporting member. For example, in the display apparatus according to an embodiment of the present disclosure, the first supporting member may include glass or stainless steel, and the second supporting member may include a metal material.

For example, the display apparatus according to an embodiment of the present disclosure may further include a rear cover on the rear surface of the at least one supporting member, and a portion of the wiring extending to the rear surface of the at least one supporting member may be covered by the rear cover. For example, the display apparatus according to an embodiment of the present disclosure may further include a rear cover on the rear surface of the at least one supporting member, and the supporting plate and a portion of the wiring extending to the rear surface of the at least one supporting member may be covered by the rear cover.

For example, in the display apparatus according to an embodiment of the present disclosure, the at least one supporting member may include a driving circuit unit configured to supply the signal to the wiring, and the wiring may be connected to the driving circuit unit. For example, the display apparatus according to an embodiment of the present disclosure may further include a rear cover on the rear surface of the at least one supporting member, and the driving circuit unit and the wiring connected to the driving circuit unit may be covered by the rear cover.

For example, the display apparatus according to an embodiment of the present disclosure may further include a pad between the at least one sound generation device and the supporting plate. For example, the display apparatus according to an embodiment of the present disclosure may further include a partition in one of: a periphery of the display panel, and a space between a first and a second of the at least one sound generation device.

For example, in the display apparatus according to an embodiment of the present disclosure, the display panel may include a first region, a second region, and a third region, and the at least one sound generation device may be in at least one of: the first region, the second region, and the third region. For example, the display apparatus according to an embodiment of the present disclosure may further include at least one first partition between the first region and the third region, and at least one second partition between the second region and the third region.

For example, the display apparatus according to an embodiment of the present disclosure may further include at least one first partition between the first region and the third region, at least one second partition between the second region and the third region, and a third partition in a periphery of the display panel, and the third partition may include a bent part that may be bent in a direction toward the at least one sound generation device. For example, the display apparatus according to an embodiment of the present disclosure may further include at least one first partition between the first region and the third region, at least one second partition between the second region and the third region, and a third partition in a periphery of the display panel, the third partition including: a bent part that may be bent in a direction toward the at least one sound generation device, and at least one protrusion portion on at least one side of the third partition.

For example, in the display apparatus according to an embodiment of the present disclosure, each of the first region and the second region may be configured to generate sound having a middle-high-pitched sound band, and the third region may be configured to generate sound having a low-pitched sound band. For example, in the display apparatus according to an embodiment of the present disclosure, the at least one sound generation device may include one of: one sound generation device, two sound generation devices, and a pair of sound generation devices.

As described above, when a display apparatus according to an embodiment of the present disclosure includes the sound generation device configured to vibrate the display panel to generate sound, the sound of the display apparatus may be output to a region in front direction or front surface of the display panel. Accordingly, an immersion experience of a viewer, who may be watching an image displayed by the display apparatus, may be enhanced.

Moreover, when a display apparatus according to an embodiment of the present disclosure includes the sound generation device that vibrates the display panel to generate sound, a speaker may not be provided. Thus, a degree of freedom in design and element disposition of a set apparatus may be enhanced.

Moreover, in a display apparatus according to an embodiment of the present disclosure, the sound generation device and the wiring for supplying a signal to the sound generation device may be covered by the supporting plate. Accordingly, a display apparatus having an enhanced sense of beauty may be provided.

Moreover, in a display apparatus according to an embodiment of the present disclosure, the sound generation device and the wiring for supplying a signal to the sound generation device may be under the supporting plate, the supporting plate and the wiring extending to the hole of the supporting plate may be covered by the rear cover, and the wiring and the sound generation device may not be exposed at the rear surface of the supporting member. Accordingly, a display apparatus having an enhanced sense of beauty may be provided.

Moreover, in a display apparatus according to an embodiment of the present disclosure, the wiring extending to the hole of the supporting plate may be covered by the rear cover, thereby solving a problem of a separate structure for hiding the wiring being provided through a process.

Moreover, in a display apparatus according to an embodiment of the present disclosure, when the supporting plate covering the sound generation device and the wiring and the wiring extending to the hole of the supporting plate are covered by the rear cover, the hidden exciter and wire structure may be implemented. Accordingly, a display apparatus having a clean-looking design may be provided.

Moreover, in a display apparatus according to an embodiment of the present disclosure, when the wiring extending to the hole of the supporting plate is covered by the rear cover, a width of each of the sound generation device and the wiring covered by the supporting plate may be reduced, thereby solving a problem in which it may be difficult for the display apparatus to have a sense of beauty due to a thickness or height of the supporting plate or disposition of the sound generation device.

Moreover, in a display apparatus according to an embodiment of the present disclosure, the first supporting member may be formed of glass or stainless steel, thereby enhancing an external design of the display device.

Moreover, in a display apparatus according to an embodiment of the present disclosure, when the first supporting member and the second supporting member are provided, the sound generation device may be closer to the front surface of the display panel by a distance corresponding to a thickness of the first supporting member, thereby decreasing a thickness of the sound generation device. Accordingly, a thickness of the display apparatus may be reduced.

Moreover, in a display apparatus according to an embodiment of the present disclosure, when the first supporting member and the second supporting member are provided, a thickness of the sound generation device may be reduced, thereby solving a problem in which a thickness or height of the supporting plate covering the sound generation device increases.

Moreover, in a display apparatus according to an embodiment of the present disclosure, when the pad is between the sound generation device and the supporting plate, heat occurring due to driving of the sound generation device may be reduced or prevented from flowing into the display panel, thereby preventing the image quality of the display panel from being degraded.

Moreover, in a display apparatus according to an embodiment of the present disclosure, when the pad is provided to contact the sound generation device, an area that allows heat to be dissipated may be enlarged. Thus, a heat dissipation effect may increase.

Moreover, in the display apparatus according to an embodiment of the present disclosure, when the partition is between one or more sound generation devices on the display panel, the partition may separate a sound. Thus, a stereo sound may be realized, and a display apparatus having an enhanced sound output characteristic may be provided.

Moreover, when the display apparatus according to an embodiment of the present disclosure includes the partition including the bent part or the protrusion, sound quality may be improved or prevented from being degraded due to the standing wave or the reflected wave that may occur in the display panel. Accordingly, a display apparatus having an enhanced sound output characteristic may be provided.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display apparatus, comprising:
   a display panel configured to display an image;
   a supporting member on a rear surface of the display panel;
   at least one sound generation device on the rear surface of the display panel, the at least one sound generation device being configured to vibrate the display panel to generate sound;
   a wiring configured to transfer a signal to the at least one sound generation device; and
   a supporting plate on the rear surface of the display panel, the supporting plate including at least one hole, and the wiring extending through the at least one hole,
   wherein a first portion of the wiring extending toward the at least one sound generation device through the at least one hole is connected to the at least one sound generation device between the supporting member and the supporting plate.

2. The display apparatus of claim 1, wherein the at least one sound generation device comprises:
   a plate comprising an extension part;
   a magnet and a center pole on the plate;
   a bobbin near the center pole;
   a coil around the bobbin; and
   a terminal in the extension part, the terminal being connected to the wiring.

3. The display apparatus of claim 1, wherein the supporting plate covers the at least one sound generation device.

4. The display apparatus of claim 1, wherein the supporting plate covers the at least one sound generation device and the wiring.

5. The display apparatus of claim 1, further comprising a pad between the at least one sound generation device and the supporting plate.

6. The display apparatus of claim 1, wherein the at least one sound generation device comprises one of: one sound generation device, two sound generation devices, and a pair of sound generation devices.

7. The display apparatus of claim 1, wherein:
the at least one sound generation device includes a pair of sound generation devices;
the pair of sound generation devices further includes one or more rib parts near the pair of sound generation devices.

8. The display apparatus of claim 1, wherein a second portion of the wiring extends to a rear surface of the supporting member through the at least one hole.

9. The display apparatus of claim 8, further comprising:
a rear cover on the rear surface of the supporting member,
wherein the rear cover covers the second portion of the wiring.

10. The display apparatus of claim 8, further comprising:
a rear cover on the rear surface of the supporting member,
wherein the rear cover covers the supporting plate and the second portion of the wiring.

11. A display apparatus, comprising:
a display panel configured to display an image;
at least one supporting member on a rear surface of the display panel;
at least one sound generation device on the rear surface of the display panel, the at least one sound generation device being configured to vibrate the display panel to generate sound;
a wiring configured to transfer a signal to the at least one sound generation device; and
a supporting plate on a rear surface of the at least one supporting member, the supporting plate including at least one hole and configured to cover the wiring,
wherein a first portion of the wiring extending toward the at least one sound generation device through the at least one hole is connected to the at least one sound generation device between the supporting member and the supporting plate.

12. The display apparatus of claim 11, wherein a second portion of the wiring extends toward a rear surface of the at least one supporting member through the at least one hole.

13. The display apparatus of claim 11, wherein the at least one sound generation device and the first portion of the wiring are covered by the supporting plate.

14. The display apparatus of claim 11, wherein the at least one sound generation device comprises:
a magnet and a center pole on a plate;
an extension part extending from the plate;
a bobbin near the center pole;
a coil around the bobbin; and
a terminal in the extension part, the terminal being connected to the wiring.

15. The display apparatus of claim 11, wherein the at least one supporting member comprises:
a first supporting member; and
a second supporting member on the first supporting member.

16. The display apparatus of claim 15, wherein:
the first supporting member comprises glass or stainless steel; and
the second supporting member comprises a metal material.

17. The display apparatus of claim 12, further comprising:
a rear cover on the rear surface of the at least one supporting member,
wherein the second portion of the wiring is covered by the rear cover.

18. The display apparatus of claim 12, further comprising:
a rear cover on the rear surface of the at least one supporting member,
wherein the supporting plate and the second portion of the wiring are covered by the rear cover.

19. The display apparatus of claim 12, wherein:
the at least one supporting member comprises a driving circuit unit configured to supply the signal to the wiring; and
the second portion of the wiring is connected to the driving circuit unit.

20. The display apparatus of claim 19, further comprising:
a rear cover on the rear surface of the at least one supporting member,
wherein the driving circuit unit and the second portion of the wiring are covered by the rear cover.

21. The display apparatus of claim 11, further comprising a pad between the at least one sound generation device and the supporting plate.

22. The display apparatus of claim 11, wherein:
the display panel comprises a first region, a second region, and a third region; and
the at least one sound generation device is in at least one of: the first region, the second region, and the third region.

23. The display apparatus of claim 22, further comprising:
at least one first partition between the first region and the third region; and
at least one second partition between the second region and the third region.

24. The display apparatus of claim 22, further comprising:
at least one first partition between the first region and the third region;
at least one second partition between the second region and the third region; and
a third partition in a periphery of the display panel,
wherein the third partition comprises a bent part on one or more sides of the third partition.

25. The display apparatus of claim 22, further comprising:
at least one first partition between the first region and the third region;
at least one second partition between the second region and the third region; and
a third partition in a periphery of the display panel, the third partition comprising:
a bent part on one or more sides of the third partition; and
at least one protrusion portion on at least one side vertical to the one or more sides of the third partition.

26. The display apparatus of claim 22, wherein:
each of the first region and the second region is configured to generate sound having a middle-high-pitched sound band; and
the third region is configured to generate sound having a low-pitched sound band.

* * * * *